(12) United States Patent
Watanabe et al.

(10) Patent No.: US 9,195,692 B2
(45) Date of Patent: Nov. 24, 2015

(54) INFORMATION PROCESSING SYSTEM

(71) Applicants:Hitachi-LG Data Storage, Inc., Tokyo (JP); Hitachi Consumer Electronics Co., Ltd., Tokyo (JP)

(72) Inventors: Yasuo Watanabe, Machida (JP); Kazuyoshi Serizawa, Tama (JP)

(73) Assignees: HITACHI-LG DATA STORAGE, INC., Tokyo (JP); HITACHI CONSUMER ELECTRONICS CO., LTD., Tokyo (JP)

( * ) Notice: Subject to any disclaimer, the term of this patent is extended or adjusted under 35 U.S.C. 154(b) by 244 days.

(21) Appl. No.: 13/853,094

(22) Filed: Mar. 29, 2013

(65) Prior Publication Data

US 2013/0275394 A1    Oct. 17, 2013

(30) Foreign Application Priority Data

Apr. 13, 2012    (JP) .................................. 2012-091514

(51) Int. Cl.
*G06F 17/30* (2006.01)
*G06F 3/06* (2006.01)

(52) U.S. Cl.
CPC ........ *G06F 17/30303* (2013.01); *G06F 3/0641* (2013.01)

(58) Field of Classification Search
None
See application file for complete search history.

(56) References Cited

U.S. PATENT DOCUMENTS

| 6,704,730 B2 | 3/2004 | Moulton et al. | |
| 7,065,619 B1* | 6/2006 | Zhu et al. ...................... | 711/162 |
| 2009/0132619 A1* | 5/2009 | Arakawa et al. .............. | 707/205 |

* cited by examiner

*Primary Examiner* — Hung Q Pham
(74) *Attorney, Agent, or Firm* — Volpe and Koenig, P.C.

(57) ABSTRACT

Deduplication is executed in a storage device having low random access performance, such as an optical disk library. When an optical disk that is not inserted into an optical disk drive needs to be accessed in order to execute binary compare, data to be binary compared is stored in a temporary memory area in order to postpone the binary compare, and on the timing when the optical disk is inserted, the postponed binary compare is executed. Before second deduplication, which is deduplication between data to be stored in the storage device and the data in the optical disk library, is executed, first deduplication, which is deduplication between the data to be stored in the storage device and the data in the temporary memory area, is executed.

16 Claims, 24 Drawing Sheets

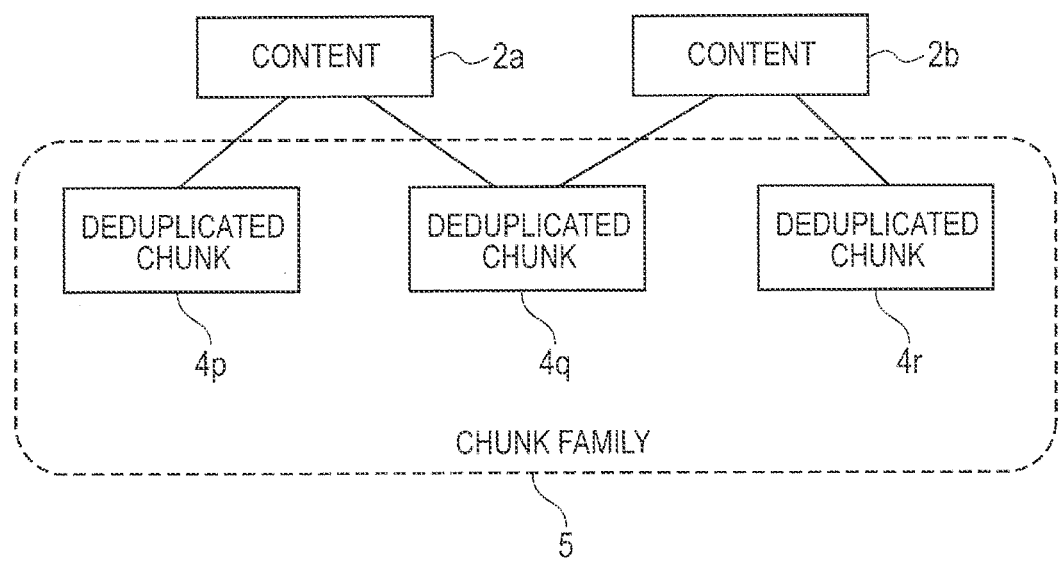

FIG. 7

OPTICAL DISK MANAGEMENT TABLE (1100)

| OPTICAL DISK # (1101) | STORAGE POSITION (1102) | FREE SPACE SIZE (1103) |
|---|---|---|
| 1 | SLOT #1 | |
| 2 | OPTICAL DISK DRIVE #1 | |
| : | : | : |

FIG. 8

OPTICAL DISK DRIVE MANAGEMENT TABLE (1200)

| OPTICAL DISK DRIVE # (1201) | INSERTED OPTICAL DISK # (1202) | LOCK STATE (1203) | LAST USAGE TIME (1204) |
|---|---|---|---|
| 1 | 5 | Locked | |
| 2 | 10 | Unlocked | |
| 3 | NULL | Unlocked | |
| : | : | : | : |

FIG. 9

CONTENT MANAGEMENT TABLE (1300)

| CONTENT # (1301) | CONSTITUENT CHUNK LIST (1302) | ACCESS-REQUIRED OPTICAL-DISK NUMBER (1303) |
|---|---|---|
| 1 | 1 IN "FIRST CHUNK MANAGEMENT TABLE"<br>2 IN "FIRST CHUNK MANAGEMENT TABLE" | |
| 2 | 1 IN "FIRST CHUNK MANAGEMENT TABLE"<br>2 IN "SECOND CHUNK MANAGEMENT TABLE" | |
| ⋮ | ⋮ | |

FIG. 10

FIRST CHUNK MANAGEMENT TABLE (1400)

| CHUNK # (1401) | HASH VALUE (1402) | STORAGE POSITION INFORMATION (1403) |
|---|---|---|
| 1 | HASH VALUE 1 | FIRST MEMORY AREA, /first/chunk1 |
| 2 | HASH VALUE 2 | FIRST MEMORY AREA, /first/chunk2 |
| ⋮ | ⋮ | ⋮ |

FIG. 11

SECOND CHUNK MANAGEMENT TABLE (1500)

| CHUNK # (1501) | HASH VALUE (1502) | STORAGE POSITION INFORMATION (1503) | DUPLICATION FREQUENCY INFORMATION (1504) |
|---|---|---|---|
| 1 | HASH VALUE 3 | WRITING BUFFER AREA, /secondary/chunk1 | |
| 2 | HASH VALUE 4 | OPTICAL DISK #1, /secondary/chunk2 | |
| : | : | : | : |

FIG. 12

CHUNK FAMILY MANAGEMENT TABLE (1600)

| CHUNK FAMILY # (1601) | BELONGING CHUNK LIST (1602) | STORAGE OPTICAL DISK LIST (1603) | TOTAL SIZE (1604) |
|---|---|---|---|
| 1 | 1 IN "SECOND CHUNK MANAGEMENT TABLE"<br>2 IN "SECOND CHUNK MANAGEMENT TABLE" | OPTICAL DISK #1 | |
| : | : | : | : |

FIG. 13

CHUNK-TO-BE-BINARY-COMPARED MANAGEMENT TABLE (1700)

| ID (1701) | REQUIRED OPTICAL DISK # (1702) | COMPARE-SOURCE CHUNK (1703) | COMPARE-DESTINATION CHUNK (1704) |
|---|---|---|---|
| 1 | 1 | 1 IN "FIRST CHUNK MANAGEMENT TABLE" | 10 IN "SECOND CHUNK MANAGEMENT TABLE" |
| 2 | 1 | 2 IN "FIRST CHUNK MANAGEMENT TABLE" | 11 IN "SECOND CHUNK MANAGEMENT TABLE" |
| : | : | : | : |

FIG. 14

CHUNK-TO-BE-WRITTEN MANAGEMENT TABLE (1800)

| ID (1801) | WRITE-DESTINATION OPTICAL DISK # (1802) | WRITTEN CHUNK (1803) |
|---|---|---|
| 1 | 1 | 10 IN "SECOND CHUNK MANAGEMENT TABLE" |
| 2 | 1 | 11 IN "SECOND CHUNK MANAGEMENT TABLE" |
| : | : | : |

FIG. 15

STATISTICAL INFORMATION MANAGEMENT TABLE 1900

| STATISTICAL INFORMATION TYPE (1901) | STATISTICAL VALUE (1902) |
|---|---|
| NUMBER OF USED ENTRIES IN FIRST CHUNK MANAGEMENT TABLE | X1 |
| NUMBER OF FREE ENTRIES IN FIRST CHUNK MANAGEMENT TABLE | X2 |
| NUMBER OF USED ENTRIES IN SECOND CHUNK MANAGEMENT TABLE | X3 |
| NUMBER OF FREE ENTRIES IN SECOND CHUNK MANAGEMENT TABLE | X4 |
| TOTAL SIZE OF CONTENT UNDER MANAGEMENT OF DEDUPLICATION SERVER [MB] | X5 |
| USED SPACE OF FIRST MEMORY AREA [MB] | X6 |
| FREE SPACE OF FIRST MEMORY AREA [MB] | X7 |
| USED SPACE OF SECOND MEMORY AREA [MB] | X8 |
| FREE SPACE OF SECOND MEMORY AREA [MB] | X9 |
| USED SPACE OF WRITING BUFFER AREA [MB] | X10 |
| FREE SPACE OF WRITING BUFFER AREA [MB] | X11 |

FIG. 16

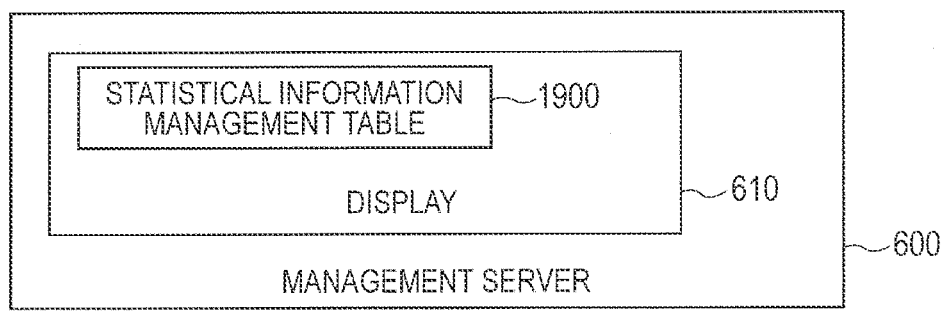

INFORMATION PROCESSING SYSTEM

INCORPORATION BY REFERENCE

This application relates to and claims priority from Japanese Patent Application No. 2012-091514 filed on Apr. 13, 2012, the entire disclosure of which is incorporated herein by reference.

BACKGROUND OF THE INVENTION (1) Field of the Invention

The present invention relates to an information processing system that executes deduplication for reducing capacity necessary for storing data.

(2) Description of the Related Arts

Business is recently conducted by utilizing electronic data in various forms, such as electronic document (electronic file) or e-mail, in various entities such as companies, public offices, and schools. The data amount of the electronic data has rapidly been increasing owing to popularization of Internet and transition of paper document to electronic data. Electronic data that should be stored (archived) in a memory medium for a long term has been increasing along with an establishment of a law that requires long-term storage of electronic data, and a movement of accumulating electronic data for a long term to utilize this data for business. The entity has to store (archive) the sharply-increasing electronic data for a long period of time with a limited budget. Therefore, it has been demanded that electronic data is stored on a recording medium with reduced cost.

As for electronic date keeping with low cost, U.S. Pat. No. 6,704,730 (hereinafter referred to as Patent Document 1) describes a technique, called deduplication, of reducing capacity of HDD (hard disk drive) necessary for storing content (file or e-mail message), for example. Specifically, in this technique, the content is divided into plural byte sequences (each byte sequence is referred to as a chunk), a duplicate chunk that completely matches the chunk already stored in a storage device is discarded without being stored in the storage device, and only chunks other than the duplicate chunk are stored in the storage device. A data structure composed of plural chunks, including the discarded chunk, for managing the content is held, whereby the content can completely be reconstructed from the chunks, other than the duplicate chunk, stored in the storage device, even after the duplicate chunk is discarded. In this technique, the determination of mismatch between hash values of two chunks, which are to be compared, is made with high speed by the process in which hash values of chunks are stored in the device, and mismatch between hash values of two chunks is determined. Even if the hash values of two chunks match, the contents of two chunks do not always exactly match. Therefore, it is confirmed that the contents of two chunks exactly match by comparing byte sequences forming the chunks (this is referred to as binary compare).

On the other hand, examples of storage medium storing electronic data include HDD (hard disk drive, magnetic disk drive), a tape, and an optical disk. Examples of a storage device using HDD as a storage medium include a disk array device including HDD and configured in an array. Examples of a storage device using a tape or an optical disk as a storage medium include a tape library and an optical disk library. The tape library and the optical disk library includes a drive (a tape drive or an optical disk drive), a slot that physically stores a storage medium and that is physically separated from the drive, and a physical conveying mechanism that physically conveys the storage medium between the slot and the drive. After the storage medium is inserted into the drive, reading/writing process to the storage medium is executed. The number of the slot is sufficiently larger than the number of the drive in general.

When the electronic data is stored with low cost, the tape library or the optical disk library, which has a bit cost lower than that of the disk array device, is effective. However, the random access performance (through-put performance, response performance) of the tape library or the optical disk library is significantly low, compared to the disk array device having no physical transfer of the storage medium, because the tape library or the optical disk library sometimes needs to physically transfer the storage medium.

The technique in Patent Document 1 is accomplished with the storage device (disk array device, etc.) using HDD having high random access performance as a storage medium. When the deduplication process is applied to the storage device in Patent Document 1, the binary compare has to be executed more frequently, so that many random accesses are generated to the storage device. However, since the random access performance of the storage device is high, this is not so significant problem. On the other hand, when the same technique is applied to the tape library or the optical disk library, much time is taken for the deduplication process due to its low random access performance, which entails a problem that the deduplication process is not finished within realistic period.

In the technique in Patent Document 1, a table for managing hash values of a chunk group is kept in the system, and this table is necessarily referred to for the deduplication process. However, when the amount of contents is large, the size of this table becomes large, resulting in that this table cannot be stored in a primary memory (memory such as DRAM) having limited capacity. In this case, the same table is stored not in the primary memory but in a secondary memory, such as HDD, having significantly larger capacity than the primary memory. However, since the secondary memory has lower access performance than the primary memory, overhead of the reference to this table becomes large, which entails a problem that the processing time for the deduplication process becomes long.

SUMMARY OF THE INVENTION

The present invention is accomplished in view of the foregoing background, and aims to provide an information processing system that applies deduplication to a content group, and that reduces overhead upon storing data of content to a storage device that involves a physical movement of a storage medium upon an access to data in the storage medium, such as a tape library or an optical disk library.

The information processing system is configured to include a host device, a deduplication server, and an optical disk library, and they are configured to be capable of mutually making communication. The deduplication server includes a first memory area and a writing buffer area. The optical disk library includes a robot, plural optical disk drives, plural slots, and plural optical disks. The writing buffer area and the optical disk are collectively referred to as a second memory area. The deduplication server holds a first chunk management table for managing a chunk stored in the first memory area, and a second chunk management table for managing a chunk stored in the second memory area. Pairs of the hash value and storage position of the chunk stored in the first and second memory areas are recorded in the first and second chunk management tables. The first and second chunk management tables are referred to, when later-described first deduplication and second deduplication are executed.

The foregoing object is attained by the deduplication server having a content storage processing unit and a content reading processing unit described later. In the content storage processing unit, the deduplication server receives content from the host device, divides the content into chunks, and stores each chunk into the deduplication server or in the optical disk library. In the content reading processing unit, the deduplication server receives a read command of the content from the host device, reads the necessary chunk from the deduplication server or from the optical disk library, reconstructs the content, and transmits the reconstructed content to the host device.

The content storage processing unit includes steps (X1) to (X11) described later. (X1) to (X6) are steps for the first deduplication, while (X7) to (X11) are steps for a part of the second deduplication.

(X1): The deduplication server determines whether or not the hash value of the chunk to be processed is already registered in the first chunk management table.

(X2): The deduplication server proceeds to (X4), if the hash value is already registered as a result of the determination in (X1).

(X3): The deduplication server proceeds to (X7), if the hash value is not registered as a result of the determination in (X1).

(X4): The deduplication server executes first binary compare that is a process of binary comparing the chunk corresponding to the hash value that is determined to be already registered in (X1) and the chunk to be processed.

(X5): The deduplication server discards the chunk to be processed, and starts the process to the next chunk, if the result of the first binary compare in (X4) is a match.

(X6): The deduplication server proceeds to (X7), if the result of the first binary compare in (X4) is not match.

(X7): The deduplication server determines whether or not the hash value of the chunk to be processed is already registered in the second chunk management table.

(X8): The deduplication server proceeds to (X10), if the hash value is already registered as a result of the determination in (X7).

(X9): The deduplication server proceeds to (X11), if the hash value is not registered as a result of the determination in (X7).

(X10): The deduplication server stores the chunk to be processed in the first memory area, and registers that the second binary compare, which is the process of binary comparing the chunk corresponding to the hash value determined in (X7) to be already registered and the chunk to be processed is scheduled to be executed, to a chunk-to-be-binary-compared management table. For simplifying the description, it is supposed that the chunk corresponding to the hash value determined in (X7) to be already registered is stored in the optical disk that is not yet inserted into the optical disk drive.

(X11): The deduplication server stores the chunk to be processed in the writing buffer area, and registers that the chunk to be processed is scheduled to be written into the optical disk to a chunk-to-be-written management table. For simplifying the description, it is supposed that the optical disk to which the chunk to be processed is to be written is an optical disk that is not yet inserted into the optical disk drive.

The content storage processing unit postpones the second binary compare and the writing.

The content reading processing unit has steps (Y1) to (Y7) described later. (Y4) to (Y7) are steps for a part of the second deduplication.

(Y1): The deduplication server receives a content read command from the host device.

(Y2): The deduplication server divides the content into chunks, and specifies a necessary chunk.

(Y3): The deduplication server inserts the optical disk, necessary for reading the necessary chunk, into the optical disk drive, reads the necessary chunk from the first memory area or from the second memory area, reconstructs the content, and transmits the reconstructed content to the host device.

(Y4): The deduplication server executes the second binary compare, which is involved with the optical disk inserted in (Y3) and is registered in the chunk-to-be-binary-compared management table.

(Y5): The deduplication server discards the chunk that is the subject for the second binary compare in the first memory area, if the result of the second binary compare is a match.

(Y6): If the result of the second binary compare in (Y4) is not match, the deduplication server transfers the chunk that is the subject for the second binary compare in the first memory area to the writing buffer area, and registers that the transferred chunk is scheduled to be written on the optical disk to the chunk-to-be-written management table. For simplifying the description, it is supposed that the optical disk to which the chunk to be processed is written is an optical disk that is not yet inserted into the optical disk drive.

(Y7): The deduplication server executes the writing that is involved with the optical disk inserted in (Y3) and that is registered in the chunk-to-be-written management table.

The content reading processing unit executes the second binary compare and the writing, which are postponed in the content storage processing unit.

The problem and the solution to this problem described in the present application will be apparent from the description in detailed description of the preferred embodiments and the description for the drawings.

According to the present invention, the first deduplication is executed before the second deduplication, whereby the chunk that is the subject for the second deduplication can be reduced, and hence, the deduplication can efficiently be executed. The second binary compare and the writing to the optical disk are postponed till the execution of the content reading processing unit, whereby the number of times of inserting the optical disk into the optical disk drive can be reduced. Consequently, the second binary compare and the writing to the optical disk can efficiently be executed in the optical disk library having low random access performance. According to the present invention, since the number of times of inserting the optical disk into the optical disk drive is reduced, the number of operating times of the robot in the optical disk drive can be reduced, whereby the lifetime of the robot can be extended.

BRIEF DESCRIPTION OF THE DRAWINGS

These and other features, objects and advantages of the present invention will become more apparent from the following description when taken in conjunction with the accompanying drawings wherein:

FIG. 5 is a view illustrating a conception of a chunk family according to the present invention;

FIG. 6 is a view illustrating an example of a structure of a file management table according to the embodiment of the present invention;

FIG. 7 is a view illustrating an example of a structure of an optical disk management table according to the embodiment of the present invention;

FIG. 8 is a view illustrating an example of a structure of an optical disk drive management table according to the embodiment of the present invention;

FIG. 9 is a view illustrating an example of a structure of a content management table according to the embodiment of the present invention;

FIG. 10 is a view illustrating an example of a structure of a first chunk management table according to the embodiment of the present invention;

FIG. 11 is a view illustrating an example of a structure of a second chunk management table according to the embodiment of the present invention;

FIG. 12 is a view illustrating an example of a structure of a chunk family management table according to the embodiment of the present invention;

FIG. 13 is a view illustrating an example of a structure of a chunk-to-be-binary-compared management table according to the embodiment of the present invention;

FIG. 14 is a view illustrating an example of a structure of a chunk-to-be-written management table according to the embodiment of the present invention;

FIG. 15 is a view illustrating an example of a structure of a statistical information management table according to the embodiment of the present invention;

FIG. 16 is a view illustrating a displayed example of a display of a management server according to the embodiment of the present invention;

DETAILED DESCRIPTION OF THE PREFERRED EMBODIMENTS

Figure 1:
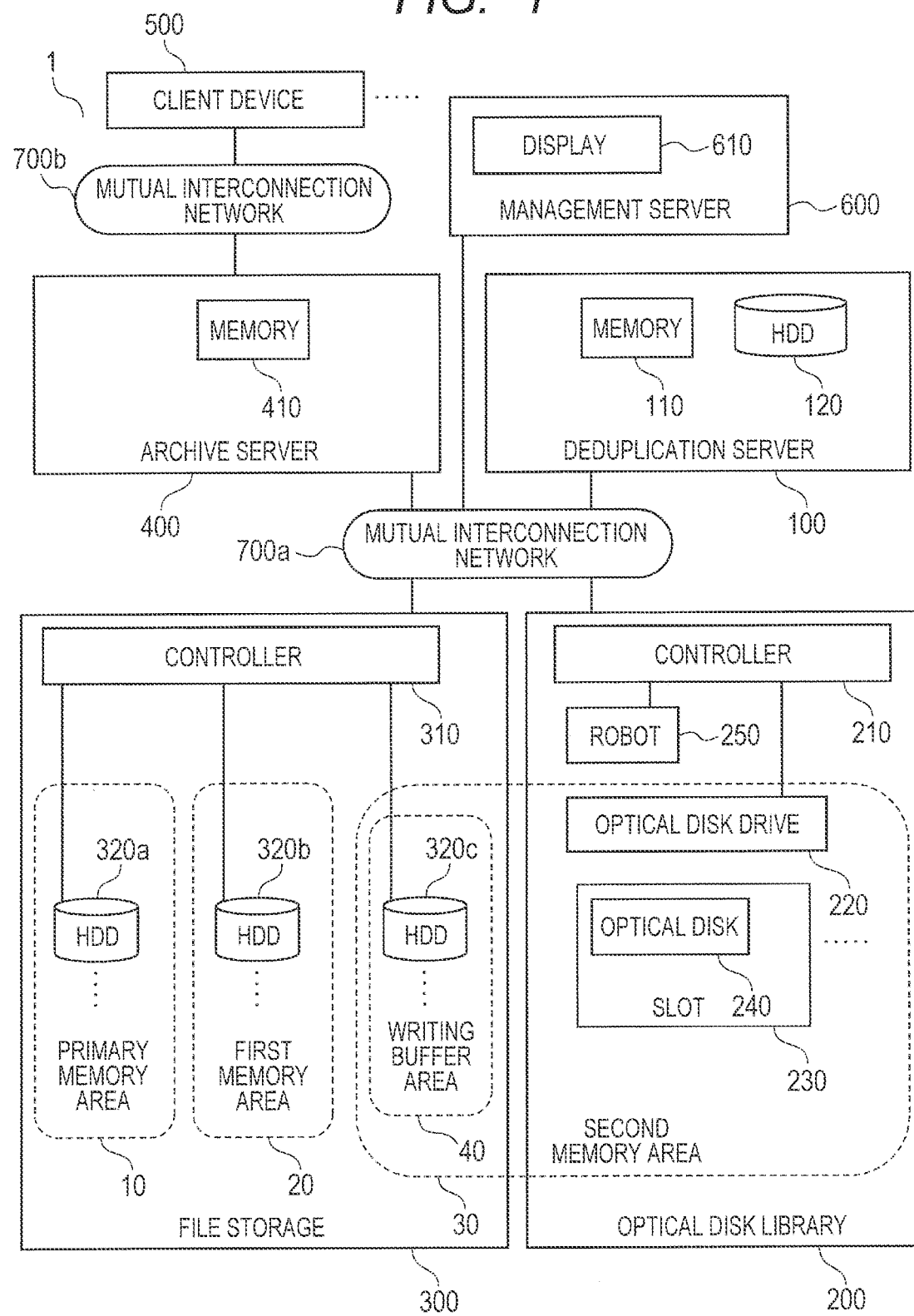
FIG. 1 is a diagram illustrating an overall configuration of an information processing system according to a first embodiment of the present invention.

Embodiments of the present invention will be described below with reference to the drawings. In the drawings for describing the embodiments, the same parts are identified by the same numerals, and the redundant description will not be given below. When the subject is a program or a function in the description, a processor or a circuit that executes the program actually executes the process.

A first embodiment will be described below. An information processing system according to the first embodiment will be described with reference to FIGS. 1 to 25. Before tables and process flows of programs used in the present embodiment are described, an overall brief operation of the information processing system 1 will be described with reference to FIG. 1, and a conceptual process of a conventional deduplication process and a deduplication process according to the present embodiment will be described with reference to FIGS. 30 and 31.

FIG. 1 illustrates the information processing system 1 according to the first embodiment. The information processing system 1 has a function of managing a file (described also as content).

Components of the information processing system 1 will firstly be described.

The information processing system 1 includes a deduplication server 100, an optical disk library 200, a file storage 300, an archive server 400, a client device 500, and a management server 600, those of which are interconnected via mutual interconnection networks 700a and 700b so as to be capable of making communication. The interconnection network 700 is a communication network using LAN (Local Area Network) or WAN (Wide Area Network). For example, the interconnection network 700 can use Ethernet (registered trademark), and can utilize TCP/IP (Transmission Control Protocol/Internet Protocol) as a communication protocol.

Subsequently, each component of the information processing system 1 will be described.

The archive server 400 will firstly be described.

The archive server 400 is a computer that controls content managed by the information processing system 1 in an integrated manner. The archive server 400 is interconnected to the deduplication server 100, the optical disk library 200, the file storage 300, the client device 500, and the management server 600 via the mutual interconnection network 700a so as to be capable of making communication.

The substance of the file (content) managed by the information processing system 1 is stored in a memory medium contained in the file storage 300 or in the optical disk library 200 that is connected to the archive server 400 so as to be capable of making communication, and the archive server 400 has a function of relaying reading/writing of the file (content). The archive server 400 also has a function of transferring the content and copying the content between the file storage 300 and the optical disk library 200 according to the access frequency to the content, a non-accessed period, or a read command to the content from the client device 500.

NFS (Network File System) or CIFS (Common Internet File System) can be used as a network protocol used when the archive server 400 reads and writes the content in the file storage 300. A unique protocol can be used, in addition to a general protocol such as NFS or CIFS, as the network protocol used when the archive server 400 reads and writes the content to the deduplication server 100. In the present embodiment, the archive server 400 uses a unique protocol when reading and writing the content to the deduplication server 100 (described later), but the invention is not limited thereto.

The archive server 400 has not only a memory 410 but also internal components not illustrated, such as a CPU (Central Processing Unit), HDD (Hard Disk Drive), or network interface. The internal components are interconnected via an internal bus.

Figure 3:
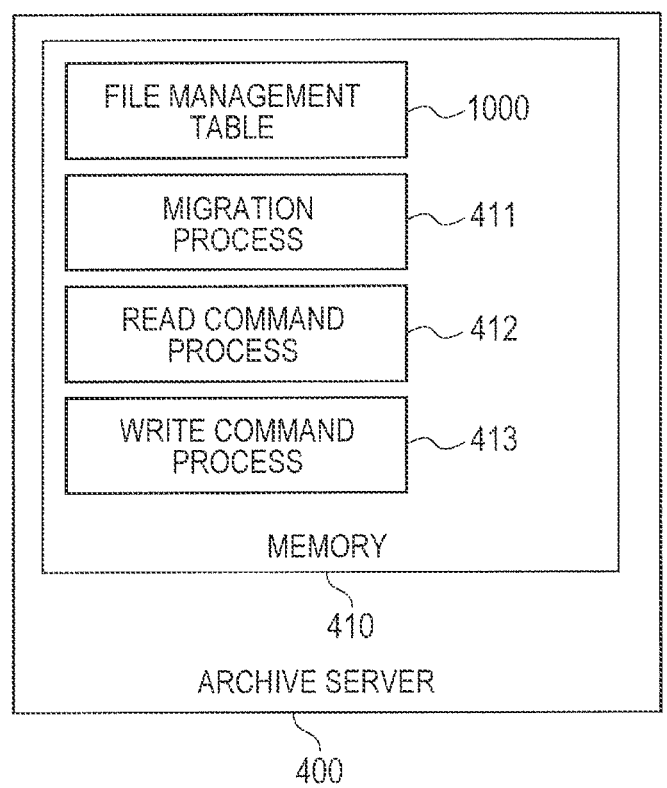
FIG. 3 is a view illustrating an example of a structure of a memory in an archive server according to the embodiment of the present invention.

FIG. 3 illustrates what is stored in the memory 410 in the archive server 400. The memory 410 stores a table such as a later-described file management table 1000, and later-described various programs such as a program for a migration process 411, a program for a read command process 412 and a program for a write command process 413. The operation of each of various programs stored in the memory 410 will be described later. Various programs stored in the memory 410 are read and executed by the CPU, not illustrated, in the archive server 400.

Returning to FIG. 1, the client device 500 will be described next.

The client device 500 is a computer that is used by a working staff (hereinafter also referred to as a user) who works by using a file reading/writing function provided by the archive server 400. The client device 500 is connected to the archive server 400 via the mutual interconnection network 700b.

The client device 500 reads/writes the content stored in the memory medium in the file storage 300, or reads a chunk (described later) stored in a memory medium of the optical disk library 200, through the archive server 400. The NFS or CIFS can be used as a network protocol used when the client device 500 reads/writes the content with respect to the archive server 400.

The client device 500 has internal components not illustrated, such as a CPU, a memory, HDD, or network interface. The internal components are interconnected via an internal bus. As a user interface, a display, a keyboard, and a mouse, which are not illustrated, are connected to the client device 500. The memory in the client device 500 stores a content writing program (not illustrated) for writing the content to the archive server 400 via the network protocol, a content reading program for reading the content from the archive server 400 via the network protocol, and a program for moving, copying, and deleting the content and for changing a file name. These programs are read and executed by the CPU in the client device 500. The user operates the client device 500 with the user interface to read/write the content with respect to the archive server 400, thereby carrying out his/her work.

The file storage 300 will next be described.

The file storage 300 is a computer for storing mainly the content used by the user. The file storage 300 can be used as a temporary memory area for the deduplication server 100. How the deduplication server 100 uses the file storage 300 will be described later. The file storage 300 is connected to the deduplication server 100, the archive server 400, and the management server 600 via the mutual interconnection network 700a so as to be capable of making communication. The NFS or CIFS can be used as a network protocol used when the archive server 400 reads/writes the content in the file storage 300.

The file storage 300 has internal components including a controller 310, and HDD 320. The internal components are interconnected via an internal bus. The controller 310 has internal components not illustrated, such as a CPU, a memory, HDD, and network interface, and they are interconnected via an internal bus. The file storage 300 is connected to the mutual interconnection network 700a via the network interface of the controller 310 in the file storage 300.

The memory of the controller 310 in the file storage 300 stores various programs such as a RAID (Redundant Array of Independent Disks) program, a snapshot program, a file system, and a network protocol program. Various programs in the memory of the controller 310 in the file storage 300 are read and executed by the CPU, not illustrated, in the controller 310.

The RAID program provides a volume that is a logical memory area formed by memory areas of plural HDD 320, and makes writing and reading to the volume possible. The RAID technique is known, so that the detailed description is skipped. A highly available and high-performance memory area can be provided by using this technique. The snapshot program is a function of creating a physical or logical copy of the volume. Even if the volume is physically or logically damaged, the volume can be recovered to the one having no damage by the snapshot program. The file system is a function provided by an operating system, and can reconstruct a memory area having a hierarchical structure on the volume. The file (content) is managed in the file system, and the file (content) contained in the file system can uniquely be identified by a file path including a directory name and a file name. The network protocol program provides a reading/writing function to the file (content) via the mutual interconnection network 700a. The archive server 400 or the deduplication server 100 can read and write the file (content) in the file storage 300 via the mutual interconnection network 700a by various programs in the file storage 300.

The optical disk library 200 will be described next.

The optical disk library 200 is a device for storing data in an incorporated optical disk.

The optical disk library 200 has internal components including a controller 210, an optical disk drive 220, a slot 230, an optical disk 240, and a robot 250. The controller 210, the optical disk drive 220, and the robot 250 are interconnected with an internal bus. The number of the optical disk drive 220, the slot 230, and the optical disk 240 may be one or more. The controller 210 may be made redundant for enhancing performance or for enhancing availability.

The controller 210 in the optical disk library 200 has internal components, not illustrated, including a memory, a CPU and HDD, and they are interconnected with an internal bus. The memory in the controller 210 stores a later-described program for accepting an instruction of insertion, and for making an insertion, a later-described program for accepting an instruction of an ejection, and for making an ejection, and a program for accepting a data write command or data read command, and for writing or reading data. These programs are read and executed by the CPU in the controller 210.

The optical disk 240 is a type of a memory medium, and it is a removable medium. The slot 230 is a physical rack into which the optical disk 240 is stored. The optical disk drive 220 is a drive that has inserted therein the optical disk 240, and that reads and writes data from and to the inserted optical disk 240. The optical disk drive 220 and the slot 230 are physically isolated. The robot 250 is a transport mechanism that physically transports the optical disk 240 between the slot 230 and the optical disk drive 220.

The optical disk library 200 provides an inserting/ejecting function of the optical disk 240 to/from the optical disk drive 220, and a data writing/reading function to the optical disk 240 via the mutual interconnection network 700a, to the deduplication server 100.

The optical disk library 200 inserts the designated optical disk 240 into the optical disk drive 220, or ejects the optical disk 240 from the optical disk drive 220 according to the insertion/ejection command of the optical disk 240 from the deduplication server 100.

The optical disk library 200 also writes the data, transmitted from the deduplication server 100, to the optical disk according to the data write command from the deduplication server 100, and reads the data from the optical disk and transmits the same data to the deduplication server 100 according to the data read command from the deduplication server 100.

The general network protocol such as the NFS or CIFS can be used when the deduplication server 100 reads/writes data with respect to the optical disk library 200 through the mutual interconnection network 700a, but in the present embodiment, the unique network protocol is used. In the present embodiment, when the data is written to the optical disk library 200 via the mutual interconnection network 700a, the data is written with the optical disk drive 220 to which the data is to be written being explicitly designated. When the data is read in the optical disk library 220 via the mutual interconnection network 700a, the data is read with the optical disk drive 220 into which the data is to be read being explicitly designated.

When the deduplication server 100 gives to the optical disk library 200 an instruction to insert the optical disk 240 into the optical disk drive 220, the deduplication server 100 designates an identifier by which the optical disk 240 to be inserted is uniquely identified in the optical disk library 200, and an identifier by which the optical disk drive 220 to which the optical disk is to be inserted is uniquely identified in the optical disk library 200. With this, the designated optical disk 240 is conveyed to the designated optical disk drive 220 by the robot 250, and then, inserted into this optical disk drive 220. When there is no free optical disk drive, the optical disk 240, which is not currently used (which is in a later-described "unlocked" state), in the optical disk drive 220 is ejected to make the optical disk drive 220 free, and then, the optical disk is inserted.

When the deduplication server 100 gives to the optical disk library 200 an instruction to eject the optical disk 240 from the optical disk drive 220, the deduplication server 100 designates an identifier by which the optical disk 240 to be ejected is uniquely identified in the optical disk library 200. The designated optical disk 240 is ejected from the optical disk drive 220, and then, conveyed to the original slot 230 by the robot 250.

The optical disk and the data stored in the optical disk will be described.

As a standard for an optical disk, there have been known a standard of write-once (non-rewritable) DVD-R or BD-R, and a standard of rewritable DVD-RW or BD-RE. DVD is an abbreviation of Digital Versatile Disk, and BD is an abbreviation of Blu-ray Disk. Even a write-once optical disk supports a recordable function. In the present embodiment, which standard is used is not specified.

The optical disk such as DVD or BD employs a file system for an optical disk called UDF (universal disk format). When a rewritable optical disk is used, data in the optical disk is updated in a block unit to change the file system, whereby a file can be added, updated, and deleted. Even in a write-once optical disk is used, the file system is logically changed by an additional writing, whereby the file can be added, logically updated, and logically deleted, although metadata and data once written cannot physically be deleted.

The file contained in the optical disk can uniquely be designated by the file path including a directory name and a file name. In the optical disk library 200 including plural optical disks 240, the file contained in the optical disk library can uniquely be designated by using the identifier by which the optical disk 240 in the optical disk library 200 is uniquely identified and the file path.

The deduplication server 100 will next be described.

Figure 2:
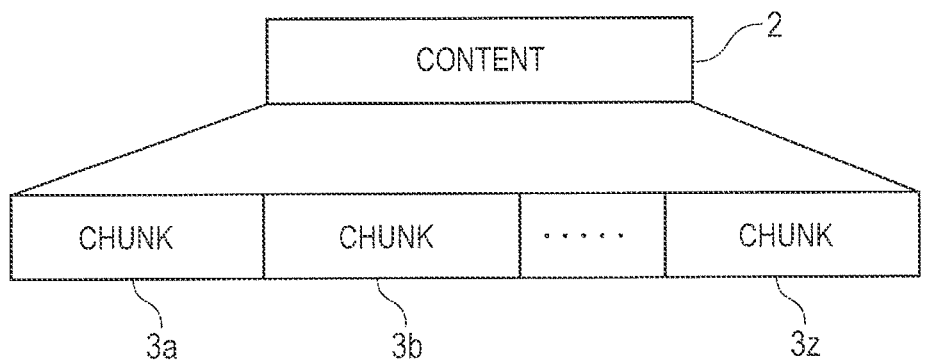
FIG. 2 is a view illustrating a relationship between content and a chunk according to the present invention.

The deduplication server 100 is a computer that provides a function of reading/writing content to the archive server 400 via the mutual interconnection network 700a, writes the content written from the archive server 400 to the optical disk library 200, and reads the content to which the read command is issued from the archive server 400 from the optical disk library 200. When writing the content in the optical disk library 200, the deduplication server 100 divides the content into plural byte sequences (referred to as a chunk) by using the above-mentioned deduplication, discards the duplicate chunk, i.e., the chunk completely agreeing with the chunk stored in the optical disk library 200, without storing in the optical disk library 200, and stores only the chunks except for the duplicate chunk into the optical disk library 200. FIG. 2 illustrates that content 2 is divided into one or more chunks 3. The size of the chunk may be a fixed length, or a variable length. A hash value of the chunk can be used in order to determine whether there is a possibility of exact match between two chunks. For example, a hash value can be calculated from data of the chunk by using a known hash function such as MD5 (Message Digest 5) or SHA-1 (Secure Hash Algorithm 1). In the case of MD5 and SHA-1, the hash value is 128-bit string or 160-bit string respectively, for example. In two chunks having exact-match hash values, the byte sequences of their data might agree with each other. Even if the hash values of two chunks completely match, the byte sequences of them might not agree with each other. The calculated hash value of the chunk is recorded in the memory 110 of the deduplication server 100, and can be used for the comparison of the hash values afterward.

The capacity of the memory area required for storing the content can be reduced by using the deduplication technique. The brief operation of the deduplication will be described later.

As described above, the present embodiment describes the case in which the unique protocol is used when the archive server 400 stores the content in the deduplication server 100, or reads the content from the deduplication server 100. However, the invention is not limited thereto. The process of storing the content in the deduplication server 100 by the archive server 400 is described in detail in a content storage process 2000 described later. The process of reading the content from the deduplication server 100 by the archive server 400 is described in detail in a content reading process 2100 described later.

When writing the chunk into the optical disk library 200, the deduplication server 100 gives an instruction of inserting the optical disk 240 to the optical disk library 200 as designating the identifier of the optical disk 240 to which the chunk is to be written, and then, writes the chunk in the inserted optical disk 240 as designating the identifier by which the corresponding chunk can uniquely be identified in the optical disk library 200 as a file path.

When reading the chunk from the optical disk library 200, the deduplication server 100 gives an instruction of inserting the optical disk 240 to the optical disk library 200 as designating the identifier of the optical disk 240 from which the chunk is to be read, and then, reads the chunk from the inserted optical disk 240 as designating the identifier by which the corresponding chunk can uniquely be identified in the optical disk library 200 as a file path.

The deduplication server 100 has a CPU and network interface, which are not illustrated, as internal components in addition to the memory 110 and the HDD 120, and they are interconnected with an internal bus. The deduplication server 100 is connected to the mutual interconnection network 700a via the network interface of the deduplication server 100.

Figure 4:
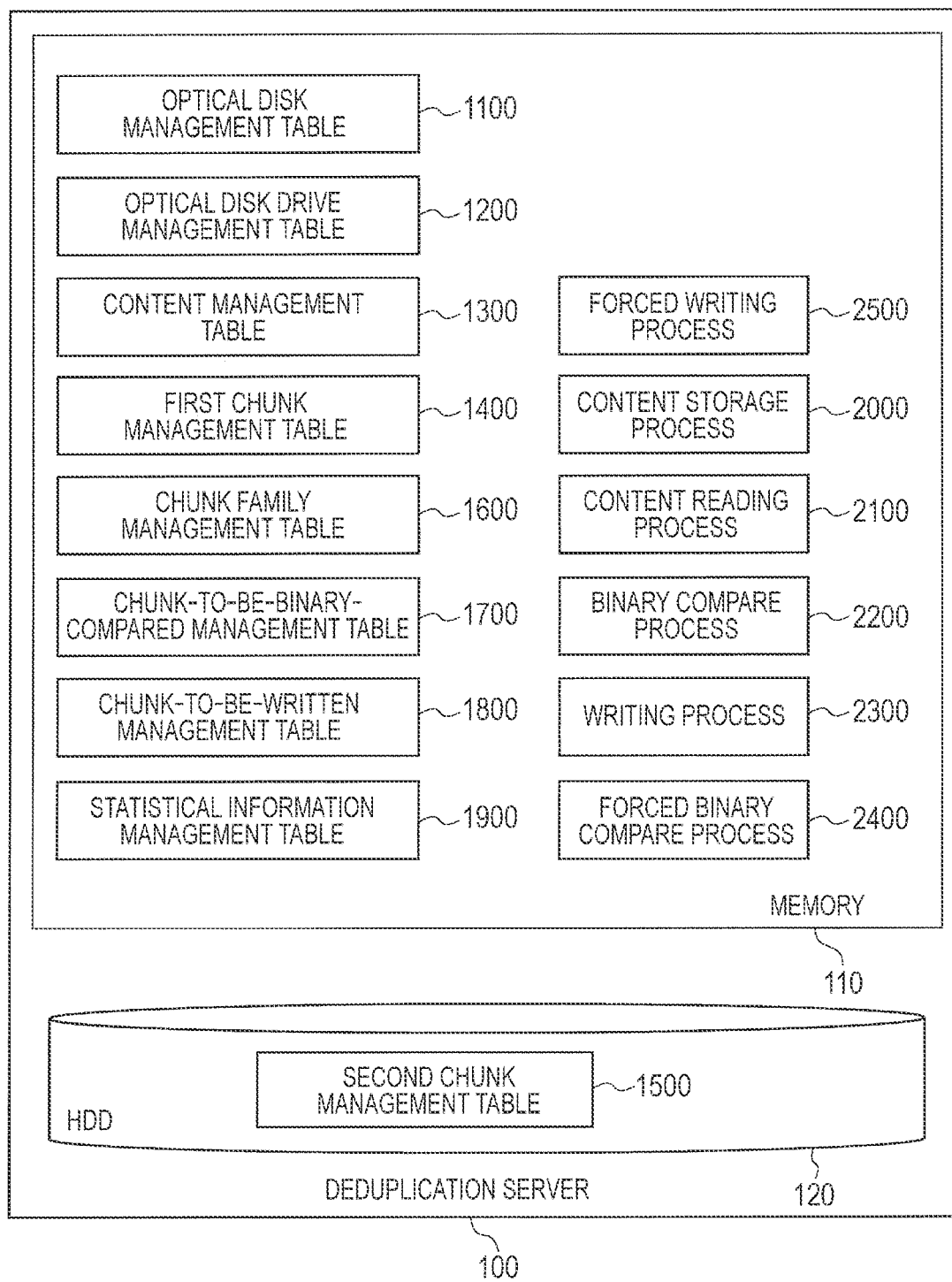
FIG. 4 is a view illustrating an example of a structure of a memory and HDD in a deduplication server according to the embodiment of the present invention.

FIG. 4 illustrates what are stored in the memory 110 and the HDD 120 of the deduplication server 100. The memory 110 stores tables including an optical disk management table 1100, an optical disk drive management table 1200, a content management table 1300, a first chunk management table 1400, a chunk family management table 1600, a chunk-to-be-binary-compared management table 1700, a chunk-to-be-written management table 1800, and a statistical information management table 1900; and programs including a content storage process 2000, a content reading process 2100, a binary compare process 2200, a writing process 2300, a forced binary compare process 2400, and a forced writing process 2500. These programs stored in the memory 110 is read and executed by the CPU, not illustrated, in the deduplication server 100. The operation of each of these programs will be described later. These tables stored in the memory 110 are referred to and updated by the CPU in the deduplication server 100 upon the execution of these programs. Each of these tables will be described later in detail. In the present embodiment, these tables are stored in the memory 110. However, these tables may be stored in any one of the HDD 120 in the deduplication server 100, the memory of the controller 310 in the file storage 300, the HDD 320 in the file storage 300, the memory or HDD in the controller 210 of the optical disk library 200, and the optical disk 240 of the optical disk library 200.

The HDD 120 stores a later-described second chunk management table 1500. In the present embodiment, this table is stored in the HDD 120. However, this table may be stored in any one of the memory 110 in the deduplication server 100, the memory of the controller 310 in the file storage 300, the HDD 320 in the file storage 300, the memory or HDD in the controller 210 of the optical disk library 200, and the optical disk 240 of the optical disk library 200.

Returning to FIG. 1, the management server 600 will next be described.

The management server 600 is a computer for managing the deduplication server 100, the optical disk library 200, the file storage 300, and the archive server 400. An administrator of the information processing system 1 can refer to various information and change setting involved with the deduplication server 100, the optical disk library 200, the file storage 300, and the archive server 400 by using the management server 600.

The management server 600 has internal components not illustrated, such as a CPU, a memory, HDD, or network interface. The internal components are interconnected via an internal bus. As a user interface, a display, a keyboard, and a mouse, which are not illustrated, are connected to the management server 600. The administrator manages the deduplication server 100, the optical disk library 200, the file storage 300, and the archive server 400 by using these units.

What information can be referred to by using the management server 600 will be described later.

The memory area in the information processing system 1 will be described next.

The file storage 300 contains plural file system areas including a primary memory area 10, a first memory area 20, and a writing buffer area 40. The primary memory area 10 is a file system area used by the archive server 400. The first memory area 20 and the writing buffer area 40 are file system areas used by the deduplication server 100. The writing buffer area 40 in the file storage 300 and all memory areas in the optical disk 240 are collectively referred to as a second memory area. The writing buffer area 40 is used for temporarily storing data (chunk) before it is written in the optical disk 240. The first memory area 20 and the writing buffer area 40 are stored on the HDD 320.

In the present embodiment, the first memory area 20 and the writing buffer area 40 are stored on the HDD 320. However, these memory areas may be stored on the optical disk 240. In this case, the optical disk 240 has to be always inserted into the optical disk drive 220, considering the random access performance.

Alternatively, the first memory area 20 and the writing buffer area 40 may be stored on the HDD 120 in the deduplication server 100.

This is the description of the information processing system 1 in the first embodiment.

Subsequently, the overall brief operation of the information processing system 1 in the present embodiment will be described with reference to FIG. 1 again. Only the basic operation will be described for simplifying the description of the brief operation.

Firstly, the brief operation after the client device 500 writes the content into the archive server 400 till the content is finally stored in the second memory area 30 or the first memory area 20 will be described.

The client device 500 firstly writes the content into the archive server 400 by using the content writing program stored in the memory in the client device 500 according to the user's instruction. The archive server 400 writes the content, written from the client device 500, into the primary memory area 10 in the file storage 300 by using the program of the write command process 413. Thereafter, the client device 500 reads and writes the content via the archive server 400 according to the user's instruction.

Then, the content is written in the deduplication server 100 by the program of the migration process 411 stored in the memory 410 in the archive server 400.

The migration and the program of the migration process 411 will briefly be described. The migration means that content is transferred between memory hierarchies, each having a different property. The memory hierarchy includes an upper hierarchy that is a memory area formed from a high-performance memory medium with high bit cost (e.g., the HDD 320 in the file storage 300) and a lower hierarchy that is a memory area formed from a low-performance memory medium with low bit cost (e.g., the optical disk 240 in the optical disk library 200). In general, when the written content becomes outdated with the lapse of time, the access to the content becomes gradually infrequent. The content that is infrequently accessed is migrated from the upper hierarchy to the lower hierarchy (migration), whereby the cost for storing the content can be reduced. When the access to the content stored in the lower hierarchy becomes frequent, this content might be migrated from the lower hierarchy to the upper hierarchy.

In order to enhance access performance to the content, the content itself can be stored in the lower hierarchy, and the copy of the content can be stored in the upper hierarchy. Two or more memory hierarchies may be present.

The program of the migration process 411 is periodically (once a day, for example) started. The content to be migrated is selected according to a policy preliminarily set by the administrator by using the management server 600 to perform the migration process. In the policy, a method of selecting the content to be migrated is specified. For example, the policy specifies the method of selecting the content, i.e., the content whose access frequency is not more than a certain threshold value, or the content whose non-accessed period is not less than a certain threshold value is selected as the content to be migrated from the upper hierarchy to the lower hierarchy, and on the contrary, the content whose access frequency is not less than a certain threshold value is selected as the content to be migrated from the lower hierarchy to the upper hierarchy.

The archive server 400 records which should be accessed, the file storage 300 or the deduplication server 100, for reading the migrated content in the later-described file management table 1000.

This is the description of the migration, and the program of the migration process 411. The brief operation will again be described.

The chunk contained in the content written in the deduplication server 100 by the program of the migration process 411 undergoes the deduplication process by the content storage process 2000 stored in the memory 110 of the deduplication server 100, and are finally stored in the first memory area 20 or the second memory area 30. The conceptual operation of the deduplication process will be described later with reference to FIG. 31. The operation of each of various programs, related to the storage of the content and stored in the memory 110 of the deduplication server 100, such as the stored content storage process 2000, will be described later. The chunk stored in the first memory area 20 is managed by the later-described first chunk management table 1400, and the chunk stored in the second memory area 30 is managed by the later-described second chunk management table 1500.

This is the brief operation after the client device 500 writes the content into the archive server 400 till the content is finally stored in the second memory area 30 or the first memory area 20.

The second memory area 30 includes plural optical disks 240. A method of selecting which one of the optical disks 240 is selected to store the chunk forming the content when the content is stored in the optical disk 240 in the second memory area 30 will supplementarily be described with reference to FIG. 5.

FIG. 5 illustrates a conceptual view of a chunk family that is to be defined from now. As illustrated in FIG. 2, the content 2 includes one or more chunks 3. However, since the chunk 3 is deduplicated, the content 2 after the deduplication includes deduplicated chunks 4 that are the chunks formed by applying the deduplication to the chunk 3. In the example in FIG. 5, the content 2a includes deduplicated chunks 4p and 4q. A content 2b includes deduplicated chunks 4q and 4r. In this case, the deduplicated chunk 4q is included in both the contents 2a and 2b. One of the chunk 3 in the content 2a and the chunk 3 in the content 2b, corresponding to the deduplicated chunk 4q, is deleted by the deduplication, since the byte sequence of data matches. In the description afterward except for the description for FIG. 5, the chunk 3 and the deduplicated chunk 4 are sometimes merely referred to as chunk.

The definition described below is applied. Specifically, (1) the content 2 is defined as a parent, and the deduplicated chunks 4 contained in the content 2 are defined as children of the parent; (2) plural deduplicated chunks 4 having common parent (content 2) are defined as brothers; (3) brothers of the brothers are also defined as brothers; and (4) the group of deduplicated chunks 4 in fraternity is defined as the chunk family 5. In other words, the chunk family 5 is a set of the deduplicated chunks 4 interrelated to one another via the content 2.

When the deduplicated chunks 4 forming the content are stored in the optical disk 240, the idea of the chunk family is applied. Specifically, the group of the deduplicated chunks 4 contained in the chunk family 5 is stored in one optical disk 240. When the total volume of the deduplicated chunks 4 contained in the chunk family 5 is large, and hence, they are not stored in one optical disk 240, the chunk family 5 is divided in order that the group is stored in plural optical disks 240. Plural chunk families 5 may be stored in one optical disk 240.

The number of the optical disks 240 that have to be accessed for the access to the content 2 can be reduced by storing the chunk in the optical disk 240 according to the idea of the chunk family described above. For example, when it is supposed that the chunk family is stored in a certain optical disk 240, it is only necessary that the user accesses to this optical disk 240 even when he/she accesses to any one of contents related to the chunk family. Therefore, the number of times of moving and loading the optical disk 240 into the optical disk drive 220 from the slot 230 can be reduced to the minimum.

This is the supplementary description of the method of selecting the optical disk 240 to which the chunk is to be stored.

Subsequently, the brief operation of reading the content written in the archive server 400 by the client device 500 will be described.

Firstly, the client device 500 issues a command for reading the content from the archive server 400 to the archive server 400 by using the content reading program stored in the memory of the client device 500 according to the user's instruction. The program of the reading command process 412 of the archive server 400 receiving this command specifies from which of the primary memory area 10 of the file storage 300 and the deduplication server 100 the content to be read can be read, and specifies the identifier of the content to be read in the file storage 300 or the deduplication server 100 by referring to the file management table 1000.

When it is determined that the content to be read can be read from the primary memory area 10 in the file storage 300, the archive server 400 reads the content to be read from the file storage 300, and transmits the read content to the client device 500.

When it is determined that the content to be read can be read from the deduplication server 100, the archive server 400 issues a command for reading the content to be read from the deduplication server 100 to the deduplication server 100. The deduplication server 100 receiving the command of reading the content by the program of the content reading process 2100 determines into which of the first memory area 20 and the second memory area 30 one or more chunks forming the content is stored. The deduplication server 100 reads the necessary chunk data from the first memory area 20 or the second memory area 30, reconstructs the content from the read chunks, and transmits the reconstructed content to the archive server 400. The archive server 400 receiving the content to be read from the deduplication server 100 transmits the received content to the client device 500.

This is the description of the brief operation of reading the content from the archive server 400 by the client device 500.

Figure 30:
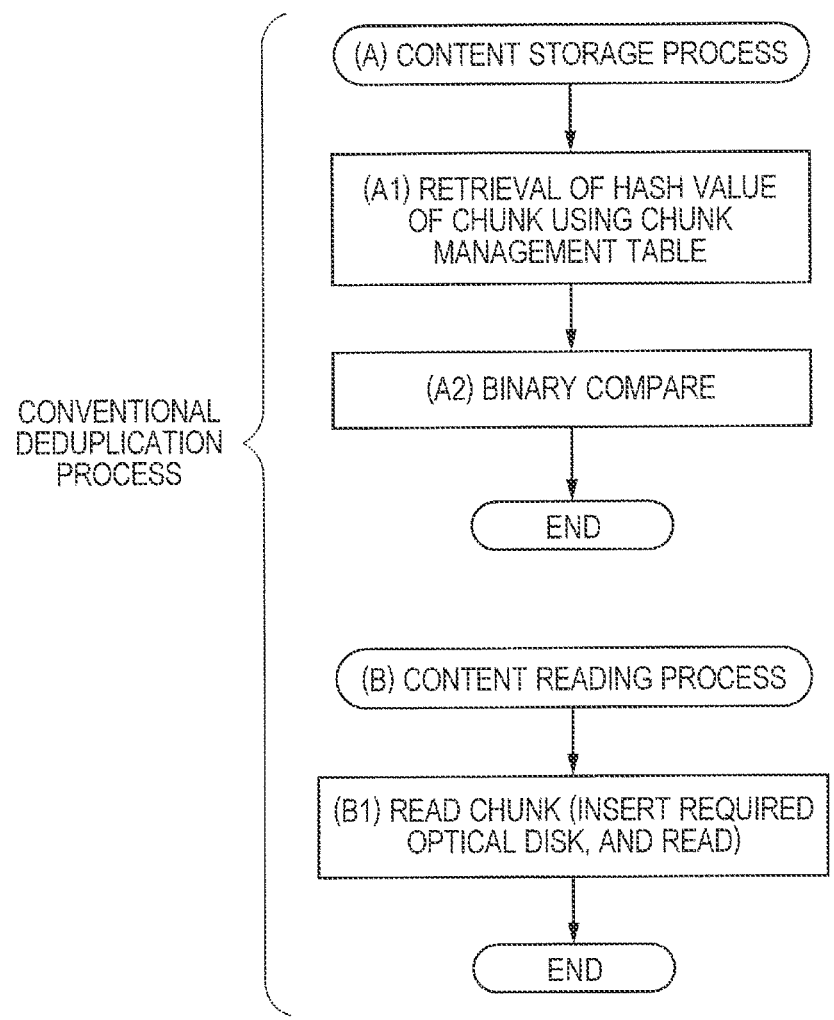
FIG. 30 is a view illustrating a conception of a conventional deduplication process.
Figure 31:
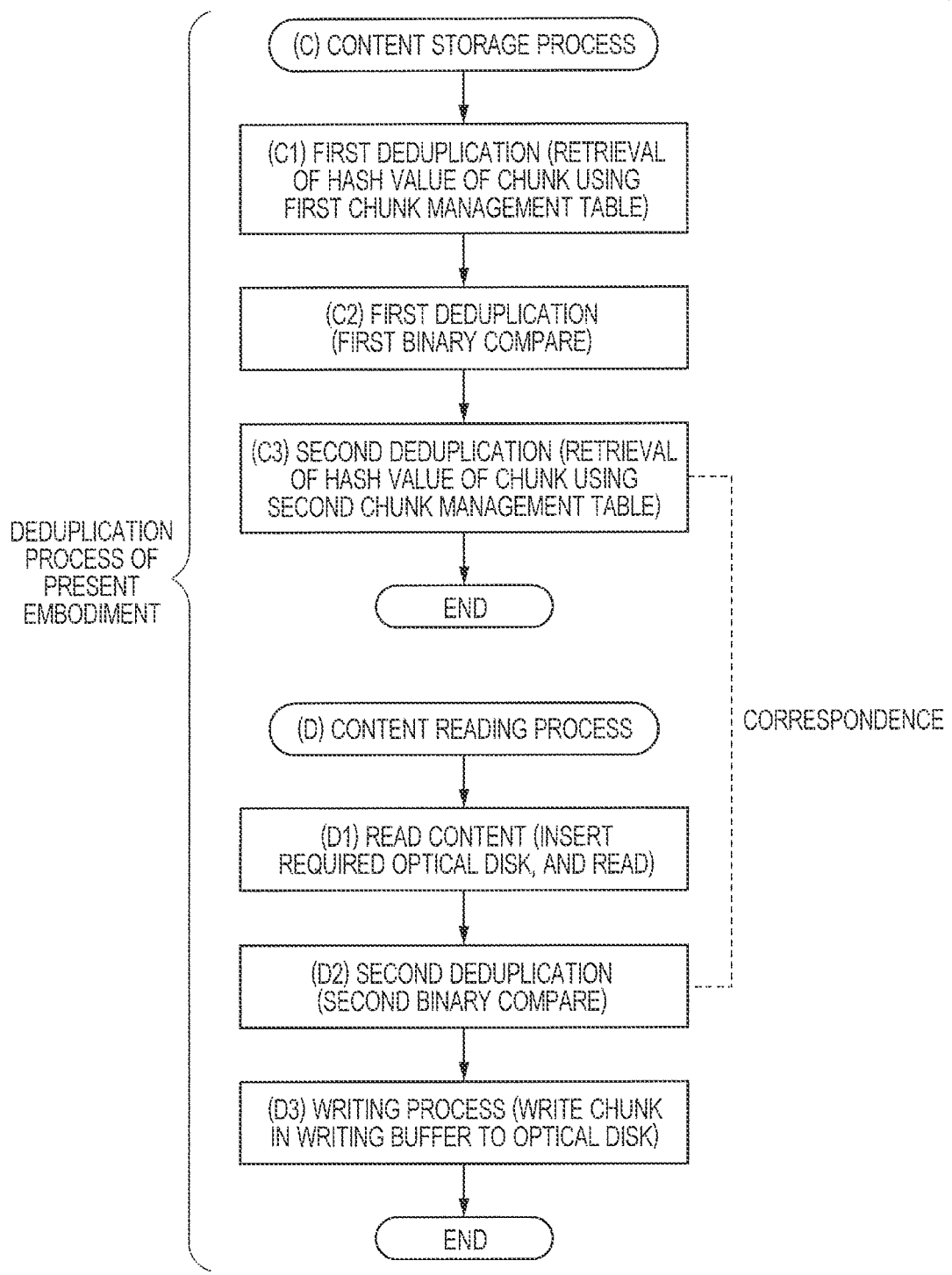
FIG. 31 is a view illustrating a conception of a deduplication process according to the embodiment of the present invention.

The conceptual conventional deduplication process and the conceptual deduplication process according to the present embodiment will be described with reference to FIGS. 30 and 31. FIGS. 30 and 31 do not illustrate the detailed process. When the subject is not clearly described in the description below, the subject is the CPU, the controller, or the like.

FIG. 30 is a conceptual view of the conventional deduplication process. In the description for FIG. 30, the memory area, managed by the deduplication server 100, in the optical disk library 200 or the file storage 300 is merely sometimes referred to as a memory area of the deduplication server 100.

In the conventional deduplication process, two tables are used, which are a chunk management table and a content management table, for managing a content.

The chunk management table has recorded therein information involved with the chunk stored in the memory area of the deduplication server 100. A chunk identifier (identifier for uniquely identifying the chunk in the deduplication server 100), a hash value of a chunk, and a storage position of a chunk are recorded for each chunk. Plural same hash values might be registered in the chunk management table. This case occurs when plural chunks have the same hash value, although the data of these chunks does not completely match.

The content management table has recorded therein information involved with the content managed by the deduplication server 100. A content identifier and a list of a chunk identifier for a chunk contained in the content are recorded for each content.

The upper flowchart in FIG. 30 is a conceptual view of (A) content storage process that is the process for storing the content in the memory area of the deduplication server 100.

In (A), the content to be stored is firstly divided into plural chunks. Thereafter, processes (A1) and (according to need) (A2) are executed for each chunk.

In the processes (A1) and (A2), if a chunk completely matching the subject chunk is present in the memory area of the deduplication server 100, the subject chunk is discarded, and if not, the subject chunk is stored in the memory area of the deduplication server.

Specifically, in (A1), a hash value agreeing with the hash value of the chunk to be processed is retrieved with reference to the chunk management table.

When the hash value agreeing with the hash value of the chunk to be processed is found, the process proceeds to (A2), since there is a possibility that the chunk completely matching the chunk to be processed is present in the memory area of the deduplication server 100.

When the hash value agreeing with the hash value of the chunk to be processed is not found, the chunk completely matching the chunk to be processed is not present in the memory area of the deduplication server 100. Therefore, the chunk to be processed is stored in the memory area of the deduplication server 100, and the chunk identifier, the hash value, and the storage position of the chunk to be processed are recorded in the chunk management table. Then, the process to the next chunk is started.

Specifically, in (A2), the chunk to be processed and the chunk that might completely match the chunk to be processed are binary compared (the comparison for confirming whether the byte sequences of two chunks match or not) in order to confirm that they completely match.

When they match as a result of the binary compare, the chunk to be processed is discarded, since it coincides with the chunk in the memory area of the deduplication server 100. Then, the process for the next chunk is started.

When they do not match as the result of the binary compare, the chunk completely matching the chunk to be processed is not present in the memory area of the deduplication server 100. Therefore, the chunk to be processed is stored in the memory area of the deduplication server 100, and the chunk identifier, the hash value, and the storage position of the chunk to be processed are registered in the chunk management table. Then, the process for the next chunk is started.

After the process for all chunks contained in the subject content is completed, the content identifier and the list of the chunk identifier of the chunk contained in the content are registered, and then, the process (A) is ended.

The lower flowchart in FIG. 30 is a conceptual view of (B) content reading process that is the process of reading the content from the memory area of the deduplication server 100. (B) is called with the content identifier to be read being designated.

In (B), the list of the chunk identifier contained in the content for the designated content identifier is specified by referring to the content management table. In (B1), each chunk corresponding to each chunk identifier is read from the memory area of the deduplication server 100 to reconstruct the content, and the reconstructed content is transmitted to the source that calls (B). In (B1), if the required chunk is stored in the optical disk 240, the optical disk 240 is inserted to read the required chunk, according to need.

This is the description of the conceptual view of the conventional deduplication process.

FIG. 31 is a conceptual view of the deduplication server according to the present embodiment of the present invention.

In the deduplication process according to the present invention, three tables that are a first chunk management table 1400, a second chunk management table 1500, and a content management table 1300 are used to manage content. Each table will be described in detail in the description for FIG. 6 and subsequent figures.

The memory area managed by the deduplication server includes two areas that are the first memory area 20 and the second memory area 30. In the first memory area 20, a chunk, to which a later-described first deduplication and a later-described second retrieval process are completed, and which waits for a later-described second binary compare process, is temporarily stored. The chunk stored in the first memory area 20 is managed by the first chunk management table 1400. In the second memory area 30, the chunk to which the second deduplication is completed is stored. The second memory area 30 includes the writing buffer area 40 and the optical disk 240. The writing buffer area 40 is the memory area into which the chunk, waiting to be written in the optical disk 240, is temporarily stored. The optical disk 240 is the memory area into which the chunk to which the second deduplication is completed is finally stored. The chunk stored in the second memory area 30 is managed by the second chunk management table 1500.

The first chunk management table 1400 has recorded therein the information involved with the chunk stored in the first memory area 20, and a chunk identifier for uniquely identifying the chunk in the first memory area 20, a hash value of the chunk, and a storage position of the chunk are recorded for each chunk.

The second chunk management table 1500 has recorded therein the information involved with the chunk stored in the second memory area 30, and a chunk identifier for uniquely identifying the chunk in the second memory area 30, a hash value of the chunk, and a storage position of the chunk are recorded for each chunk.

The content management table 1300 has recorded therein information involved with the content managed by the deduplication server 100. A content identifier and a list of a chunk identifier (including information by which a chunk can be identified as a chunk managed by the first chunk management table 1400 or a chunk managed by the second chunk management table 1500) for a chunk contained in the content are recorded for each content.

The upper flowchart in FIG. 31 is a conceptual view of (C) content storage process that is the process for storing the content in the first memory area 20 or the second memory area 30. (C1) and (C2) are the process of the first deduplication, and (C3) is a part of the process of the second deduplication.

In (C), the content to be stored is firstly divided into plural chunks. Thereafter, processes (C1) and (according to need) (C2) are executed for each chunk.

In the processes (C1) and (C2), if a chunk completely matching the chunk to be processed is present in the first memory area 20, the chunk to be processed is discarded, and if not, a process (C3) is applied to the chunk to be processed.

Specifically, in (C1), a first retrieval process for retrieving a hash value agreeing with the hash value of the chunk to be processed is executed by referring to the first chunk management table 1400.

When the hash value agreeing with the hash value of the chunk to be processed is found in (C1), the process proceeds to (C2), since there is a possibility that the chunk completely matching the chunk to be processed is present in the first memory area 20. When the hash value agreeing with the hash value of the chunk to be processed is not found, the chunk completely matching the chunk to be processed is not present in the first memory area 20. Therefore, the process proceeds to (C3).

In (C2), a first binary compare that is a process for comparing the byte sequence of the chunk to be processed and the byte sequence of the chunk that might completely match the chunk to be processed is executed to confirm whether the chunk to be processed and the chunk that might completely match the chunk to be processed completely match or not.

When they match as a result of the first binary compare, the chunk to be processed is discarded, since it coincides with the chunk in the first memory area 20. When they do not match as the result of the first binary compare, the chunk completely matching the chunk to be processed is not present in the first memory 20. Therefore, the process proceeds to (C3).

In (C3), a second retrieval process for retrieving a hash value agreeing with the hash value of the chunk to be processed is executed by referring to the second chunk management table 1500.

When the hash value agreeing with the hash value of the chunk to be processed is found in (C3), which means there is a possibility that the chunk completely matching the chunk to be processed is present in the second memory area 30, the corresponding chunk is stored in the first memory area 20, the chunk identifier, the hash value, and the storage position of the chunk to be processed are registered in the first chunk management table 1400, information (this information is managed by the chunk-to-be-binary-compared management table 1700) indicating that the second binary compare in (D2) is to be executed on a certain point after the completion of (C) is registered, the content identifier and the list of the chunk identifier of the chunk contained in the content are registered in the content management table 1300, and then, the process for the next chunk is started. In summary, in (C3), the execution of the second binary compare is postponed. In the second binary compare in (D2), the subject chunk and the chunk, which might completely match the subject chunk, in the second memory area 30 are binary compared.

When the hash value agreeing with the hash value of the chunk to be processed is not found in (C3), which means that the chunk completely matching the chunk to be processed is not present in the second memory area 30, the corresponding chunk is stored in the writing buffer area 40, the chunk identifier, the hash value, and the storage position of the chunk to be processed are registered in the second chunk management table 1500, information (this information is managed by the chunk-to-be-written management table 1800) indicating that the writing process in (D3) is to be executed on a certain point after the completion of (C) is registered, the content identifier and the list of the chunk identifier of the chunk contained in the content are registered in the content management table 1300, and then, the process for the next chunk is started. In summary, in (C3), the execution of the writing to the optical disk is postponed.

After the process for all chunks contained in the subject content is completed, the content identifier and the list of the chunk identifier of the chunk contained in the content are registered, and then, the process (C) is ended.

The lower flowchart in FIG. 31 is a conceptual view of (D) content reading process that is the process of reading the content from the memory area of the deduplication server 100. (D) is called with the content identifier to be read being designated. Different from (B) in FIG. 30, (D) executes the process (D1) same as the process (B1) of reading the designated content, and in addition to this, executes the second binary compare in the second deduplication in (D2), and the writing process of writing the chunk in the writing buffer area 40 into the optical disk in (D3).

Specifically, in (D2), the second binary compare, out of the second binary compares registered to be executed in (C3), involved with the chunk contained in the optical disk 240 inserted upon reading the designated content is executed. In summary, in (D2), the second binary compare that is postponed in (C3) is executed.

When they match as a result of the second binary compare, the chunk to be processed in the first memory area 20 is discarded, since the chunk to be processed in the first memory area 20 coincides with the chunk to be processed in the optical disk 240.

When they do not match as the result of the second binary compare, the chunk completely matching the chunk to be processed in the first memory area 20 is not present in the optical disk 240. Therefore, the chunk to be processed in the first memory area 20 is stored in the writing buffer area 40 in the second memory area 30, the chunk identifier, the hash value, and the storage position of the chunk to be processed are registered in the second chunk management table 1500, information (this information is managed by the chunk-to-be-written management table 1800) indicating that the writing process in (D3) is to be executed on a certain point after the completion of (D2) is registered, and the chunk to be processed in the first memory area 20 is discarded (simultaneously, the corresponding entry of the first chunk management table 1400 is deleted).

In (D3), the writing process in which the optical disk 240 inserted upon reading the designated content is specified as the writing destination is executed, out of the writing process registered to be executed in (C3) or (D2). The chunk, which is written onto the optical disk 240, in the writing buffer area 40 is discarded, and the second chunk management table is updated corresponding to this process. In summary, in (D3), the postponed writing to the optical disk is executed.

The merits of the present embodiment will be described below. In general, a large number of chunks are stored in the second memory area 30. Therefore, the size of the second chunk management table 1500 that manages these chunks often becomes larger than the size of the memory 110 in the deduplication server 100. Accordingly, it is appropriate that the second chunk management table 1500 is stored in the HDD 120, not in the memory 110. However, in this case, access overhead to the second chunk management table 1500 becomes a problem, since the HDD 120 has access cost larger than the memory 110. In the present embodiment, the first deduplication is executed before the second deduplication that causes the access to the second chunk management table 1500, and the second deduplication is applied only to the chunk that is not discarded in the first deduplication. With this process, the second deduplication can be skipped with respect to the chunk discarded in the first deduplication, so that the number of times of the access to the second chunk management table 1500 can be reduced. In addition, the number of times of the second binary compare in the second deduplication can be reduced. Since the number of times of the access to the second chunk management table 1500 is reduced, the time taken for the deduplication process in the present embodiment can be shortened.

In the present embodiment, the execution of the second binary compare is postponed to the point when the optical disk 240 involved with the second binary compare is inserted in the content reading process. Therefore, the insertion of the optical disk 240 only for the execution of the second binary compare is avoided, whereby the number of times of inserting the optical disk 240 can be reduced as a whole.

In the present embodiment, the execution of the writing process of writing the chunk to the optical disk 240 is postponed to the point when the optical disk 240 involved with the writing process is inserted in the content reading process. Therefore, the insertion of the optical disk 240 only for the writing process is avoided, whereby the number of times of inserting the optical disk 240 can be reduced as a whole.

Since the number of times of inserting the optical disk 240 is reduced, the operating times of the robot 250 in the optical disk library 200 is reduced, whereby the lifetime of the robot 250 can be extended.

The tables in the present embodiment will next be described with reference to FIGS. 6 to 15.

FIG. 6 illustrates an example of a structure of the file management table 1000.

The file management table 1000 is a table for managing information involved with the content (file) managed by the archive server 400.

The file management table 1000 includes a file path 1001, a content identifier in file storage 1002, a content identifier in deduplication server 1003, and metadata not illustrated.

The file path 1001 is an identifier for uniquely identifying the content (file) in the archive server 400. For example, it is expressed as a character string containing a directory name and a file name. The content designated by the file path 1001 is referred to as the subject content.

The content identifier in file storage 1002 is information indicating the identifier of the subject content in the file storage 300. When the subject content is stored in the file storage 300, the identifier of the subject content in the file storage 300 is recorded in the entry of the content identifier in file storage 1002. When the subject content is not stored in the file storage 300, "NULL" that is an invalid value is recorded in the entry of the content identifier in file storage 1002.

The content identifier in deduplication server 1003 is information indicating the identifier of the subject content in the deduplication server 100. When the subject content is managed by the deduplication server 100, the identifier of the subject content in the deduplication server 100 is recorded in the entry of the content identifier in deduplication server 1003. When the subject content is not managed by the deduplication server 100, the "NULL" that is an invalid value is recorded in the entry of the content identifier in deduplication server 1003.

The metadata in the file management table 1000 is information involved with the subject content, and includes a size, a creation time, a last update time, a last access time, an owner, and access control information.

FIG. 6 illustrates that the archive server 400 manages the content (file) having the file path of "/foo/bar1.txt", "/foo/bar2.txt", and "/foo/bar3.txt". It is illustrated that the content designated by the file path "/foo/bar1.txt" is stored in the file storage 300 as the content having the identifier of "/foo/bar1.txt". It is illustrated that the content designated by the file path "/foo/bar2.txt" is stored in the deduplication server 100 as the content having the identifier of "1". It is illustrated that the content designated by the file path "/foo/bar3.txt" is stored in the file storage 300 as the content having the identifier of "/foo/bar3.txt", and is managed in the deduplication server 100 as the content having the identifier of "10" (in this case, the content is present in two places).

FIG. 7 illustrates an example of a structure of the optical disk management table 1100.

The optical disk management table 1100 is a table for managing the physical storage position of the optical disk 240 contained in the optical disk library 240.

The optical disk management table 1100 includes an optical disk #1101, a storage position 1102, and a free space size 1103.

The optical disk #1101 is an identifier for uniquely identifying the optical disk 240 in the optical disk library 200. The optical disk identified by the optical disk #1101 is referred to as the subject optical disk.

The storage position 1102 is information indicating the physical storage position of the subject optical disk. The optical disk #1101 stores either one of the identifier of the slot 230 and the identifier of the optical disk drive 220.

The free space size 1103 is information indicating the size of the free space of the subject optical disk.

In FIG. 7, the optical disk 240 identified by the identifier "1" is stored in the slot 230. The optical disk 240 identified by the identifier "2" is stored in the optical disk drive 220.

FIG. 8 illustrates an example of a structure of the optical disk drive management table 1200.

The optical disk drive management table 1200 is a table for managing the state of the optical disk drive 220.

The optical disk drive management table 1200 includes an optical disk drive #1201, an inserted optical disk #1202, a lock state 1203, and a last usage time 1204.

The optical disk drive #1201 is an identifier for uniquely identifying the optical disk drive 220 in the optical disk library 200. The optical disk drive 220 identified by the optical disk drive #1201 is referred to as the subject optical disk drive.

The inserted optical disk #1202 is information indicating the identifier of the optical disk 240 that is inserted into the subject optical disk drive. When the optical disk 240 is not inserted into the optical disk drive 220, the "NULL" that is an invalid value is recorded.

The lock state 1203 is information indicating that the subject optical disk drive is occupied (locked) by a thread of the program in the deduplication server 100. Since the program in the deduplication server 100 can operate with multi-thread, there can be plural threads of the program. A value "Locked" in the lock state 1203 indicates that it is locked, while a value "Unlocked" indicates that it is unlocked (not locked). When the subject optical disk drive 220 is locked, a thread other than the thread of the program that locks cannot use (reading/writing, insertion, ejection) the subject optical disk drive.

The last usage time 1204 is information indicating the time when the program in the deduplication server 100 last uses (reading/writing, insertion, ejection) the optical disk drive 220 identified by the optical disk drive #1201.

In FIG. 8, the optical disk 240 identified by "5" has already been inserted in the optical disk drive 220 identified by "1", and this optical disk drive 220 is occupied (locked) by the thread of the program in the deduplication server 100. It is also illustrated that the optical disk 240 identified by "10" has already been inserted in the optical disk drive 220 identified by "2", and this optical disk drive 220 is not occupied (not locked) by the thread of the program in the deduplication server 100. It is also illustrated that no optical disk 240 is inserted in the optical disk drive 220 identified by "3", and this optical disk drive 220 is not occupied (not locked) by the thread of the program in the deduplication server 100.

An example of the policy of the way of using the optical disk drive 220 by the thread of the program in the deduplication server 100 will be described.

Firstly, the policy of locking/unlocking and mounting/unmounting the optical disk drive 220 will be described. The thread of the program in the deduplication server 100 locks a certain optical disk drive 220, inserts the optical disk 240 into the locked optical disk drive 220, executes the reading/writing process to the inserted optical disk 240, and then, unlocks this optical disk drive 220. In this case, the thread of the program in the deduplication server 100 can employ the policy in which the optical disk 240 that has been inserted is not ejected from the optical disk drive 220, i.e., the optical disk 240 is not aggressively ejected. According to the policy described above, in case where the thread unlocks the optical disk 240, and after a short while, this optical disk 240 is again used, the optical disk has already been inserted. Therefore, the overhead of inserting again the optical disk can be reduced.

Next, the policy of selecting the optical disk drive 220 to be used will be described. The policy of selecting the optical disk drive 220 to be used includes, for example, a policy of selecting the optical disk drive 220 having the oldest last usage time 1204, out of the optical disk drives 220 whose lock state 1203 is "Unlocked". The optical disk drive 220 that is not likely used again can be selected by employing this policy.

FIG. 9 illustrates an example of a structure of the content management table 1300.

The content management table 1300 is information for managing the content 2 in the deduplication server 100.

The content management table 1300 includes a content #1301, a constituent chunk list 1302, an access-required optical-disk number 1303, and a size not illustrated.

The content #1301 is an identifier for uniquely identifying the content in the deduplication server 100. The content identified by the content #1301 is referred to as the subject content.

The constituent chunk list 1302 is information indicating the list of chunks forming the subject content. In FIG. 9, the content identified by the identifier "1" is composed of the chunk identified by the identifier "1" and the chunk identified by the identifier "2" in the (later-described) first chunk management table 1400. It is also illustrated that the content identified by the identifier "2" is composed of the chunk identified by the identifier "1" in the (later-described) first chunk management table 1400 and the chunk identified by the identifier "2" in the (later-described) second chunk management table 1500.

The access-required optical-disk number 1303 is information indicating the number of optical disks required upon reading the subject content. When the chunks forming the content are all stored in one optical disk 240, for example, the access-required optical-disk number 1303 is one. When the chunks forming the content are all stored in the first memory area 20 or the writing buffer area 40, the access-required optical-disk number 1303 is zero.

When the chunk family is divided, and the chunks contained in the chunk family are stored in plural optical disks 240, the chunk family is divided in such a manner that the total of the access-required optical-disk number 1303 of the content 2 contained in the chunk family becomes as small as possible.

The size of the content management table 1300 is information indicating the size of the content.

FIG. 10 illustrates an example of a structure of the first chunk management table 1400.

The first chunk management table 1400 is information for managing the chunk stored in the first memory area 20. When the chunk is stored in the first memory area 20, a new entry is added to this table, and when the chunk is deleted from the first memory area 20, the entry corresponding to the deleted chunk is deleted from this table.

An index can be used for accessing to each entry in the first chunk management table 1400 with high speed. As a data structure of the index, a known hash table can be used, for example, in which plural sets (referred to as entry) of a key and a value are stored, and the value corresponding to the key is promptly referred to. In this case, the key in the hash table is a later-described hash value 1402. When the hash table is used as the index, the later-described hash value 1402 is not stored in the first chunk management table 1400.

The first chunk management table 1400 includes a chunk #1401, the hash value 1402, storage position information 1403, and a size not illustrated.

The chunk #1401 is an identifier for uniquely identifying the chunk in the first memory area 20. The chunk identified by the chunk #1401 in the first memory area 20 is referred to as the subject chunk.

The hash value 1402 is a hash value to the data of the subject chunk. The known hash function such as MD5 or SHA-1 described above can be used for the calculation of the hash value.

The storage position information 1403 is information indicating the storage position of the subject chunk.

The size of the first chunk management table 1400 is information indicating the size of the subject chunk.

In FIG. 10, the hash value of the chunk designated by the identifier "1" is "hash value 1" (e.g., a bit string of 128 bits or 160 bits), and the storage position is the position designated by the file path "/first/chunk1" in the first memory area 20.

FIG. 11 illustrates an example of a structure of the second chunk management table 1500.

The second chunk management table 1500 is information for managing the chunk stored in the second memory area 30. When the chunk is stored in the second memory area 30, a new entry is added to this table, and when the chunk is deleted from the second memory area 30, the entry corresponding to the deleted chunk is deleted from this table.

An index can be used for accessing to each entry in the second chunk management table 1500 with high speed. As a data structure of the index, the hash table described above can be used. In this case, the key in the hash table is a later-described hash value 1502.

The second chunk management table 1500 includes a chunk #1501, the hash value 1502, storage position information 1503, duplication frequency information 1504, and a size not illustrated.

The chunk #1501 is an identifier for uniquely identifying the deduplicated chunk in the second memory area 30. The chunk identified by the chunk #1501 in the second memory area 30 is referred to as the subject chunk.

The hash value 1502 is a hash value to the data of the subject chunk. The known hash function such as MD5 or SHA-1 described above can be used for the calculation of the hash value.

The storage position information 1503 is information indicating the storage position of the subject chunk.

The duplication frequency information 1504 is information indicating the frequency (number of times) of detecting duplication within a predetermined period for the subject chunk.

The size of the second chunk management table 1500 is information indicating the size of the subject chunk.

In FIG. 11, the hash value of the deduplicated chunk designated by the identifier "1" is "hash value 3" (e.g., a bit string of 128 bits or 160 bits), and the storage position is the position designated by the file path "/secondary/chunk1" in the writing buffer area 40. The hash value of the deduplicated chunk designated by the identifier "2" is "hash value 4" (e.g., a bit string of 128 bits or 160 bits), and the storage position is the position designated by the file path "/secondary/chunk2" in the optical disk 240.

FIG. 12 illustrates an example of a structure of the chunk family management table 1600.

The chunk family management table 1600 is information for managing the above-mentioned structure of the chunk family.

The chunk family management table 1600 includes a chunk family #1601, a belonging chunk list 1602, a storage optical disk list 1603, and a total size 1604.

The chunk family #1601 is an identifier for uniquely identifying the chunk family 5 in the deduplication server 100. The chunk family 5 designated by the chunk family #1601 is referred to as the subject chunk family.

The belonging chunk list 1602 is a list of the deduplicated chunks 4 belonging to the subject chunk family.

The storage optical disk list 1603 is a list of the optical disks 240 storing the deduplicated chunk 4 belonging to the subject chunk family. A group of the deduplicated chunks 4 belonging to the subject chunk family may be stored in one optical disk 240, or in plural optical disks 240 (when the total size of the chunk family 5 is large).

The total size 1604 is a total size of the group of the deduplicated chunks 4 belonging to the subject chunk family.

In FIG. 12, the chunk family 5 designated by the identifier "1" includes the deduplicated chunk 4 designated by the identifier "1" in the second chunk management table 1500 and the deduplicated chunk 4 designated by the identifier "2" in the second chunk management table 1500 as the constituent, and these deduplicated chunks 4 are stored in the optical disk 240 designated by the identifier "1".

FIG. 13 illustrates an example of a structure of the chunk-to-be-binary-compared management table 1700.

The chunk-to-be-binary-compared management table 1700 is information for managing a pair of the chunk in the first memory area 20 and the chunk in the second memory area 30 (more correctly, in the optical disk 240), wherein these chunks are scheduled to undergo the later-described second binary compare, but they have not yet undergone the second binary compare. The second binary compare means the binary compare between a certain chunk and a chunk in the second memory area 30 (more correctly, in the optical disk 240).

The chunk-to-be-binary-compared management table 1700 includes an ID 1701, a required optical disk #1702, a compare-source chunk 1703, and a compare-destination chunk 1704.

The ID 1701 is an identifier for uniquely identifying the second binary compare that is scheduled to be executed. The second binary compare designated by the ID 1701 is referred to as the subject second binary compare.

The required optical disk #1702 is an identifier for designating the optical disk 240 required for the subject second binary compare.

The compare-source chunk 1703 is information indicating the chunk, in the first memory area 20, managed by the first chunk management table 1400, the chunk being a source chunk of the subject second binary compare.

The compare-destination chunk 1704 is information indicating the chunk, in the second memory area 30, managed by the second chunk management table 1500, the chunk being a destination chunk of the subject second binary compare.

In FIG. 13, the compare-source chunk is the chunk designated by the identifier "1" in the first chunk management table 1400, the compare-destination chunk is the chunk designated by the identifier "10" in the second chunk management table 1500, and the optical disk 240 designated by the identifier "1" is required when the second binary compare is executed to the compare-source chunk and the compare-destination chunk (i.e., the compare-destination chunk is stored in the optical disk 240 designated by the identifier "1").

FIG. 14 illustrates an example of a structure of the chunk-to-be-written management table 1800.

The chunk-to-be-written management table 1800 is a table for managing a chunk, which is to be written in the optical disk 240, but has not yet been written, in the writing buffer area 40.

The chunk-to-be-written management table 1800 includes an ID 1801, a write-destination optical disk #1802, and a written chunk 1803.

The ID 1801 is an identifier for uniquely identifying the writing that is to be executed. The writing designated by the ID 1801 is referred to as the subject writing.

The write-destination optical disk #1802 is an identifier for designating the optical disk 240 that is the write-destination of the subject writing.

The written chunk 1803 is information indicating a chunk, which is the subject to be written and managed by the second chunk management table 1500, in the writing buffer area 40.

In FIG. 14, in the writing designated by the identifier "1", the chunk designated by the identifier "10" in the second chunk management table 1500 is the subject, and the optical disk 240 that becomes the writing destination is the optical disk 240 designated by the identifier "1".

FIG. 15 illustrates an example of a structure of a statistical information management table 1900.

The statistical information management table 1900 is a table for managing various statistical information managed by the deduplication server 100.

The statistical information management table 1900 includes a statistical information type 1901 and a statistical value 1902.

The statistical information type 1901 is information indicating a type of the statistical information. The type of the statistical information includes "used space [MB] of first chunk management table", "used space [MB] of second chunk management table", "free space [MB] of first chunk management table", "free space [MB] of second chunk management table", "total size [MB] of content under management of deduplication server", "used space [MB] of first memory area", "free space [MB] of first memory area", "used space [MB] of second memory area", "free space [MB] of second memory area", "used space [MB] of writing buffer area", and "free space [MB] of writing buffer area". The meaning and update timing of each statistical information will be described below.

"Number of used entries in first chunk management table" indicates a total number of entries that have already been used by the first chunk management table 1400. "Number of free entries of first chunk management table" indicates a total number of free entries in the first chunk management table 1400. The statistical values 1902 of the "number of used entries in first management table" and the "number of free entries in first chunk management table" are updated when an entry is added to the first chunk management table 1400, or an entry is deleted from the first chunk management table 1400.

"Number of used entries in second chunk management table" indicates a total number of entries that have already been used by the second chunk management table 1500. "Number of free entries of second chunk management table" indicates a total number of free entries in the second chunk management table 1500. The statistical values 1902 of the "number of used entries in second management table" and the "number of free entries in second chunk management table" are updated when an entry is added to the second chunk management table 1500, or an entry is deleted from the second chunk management table 1500.

"Total size [MB] of content under management of deduplication server" indicates a total of the size of the content 2 contained in the content management table 1300. The statistical value 1902 of the "total size [MB] of content under management of deduplication server" is updated when content is stored in the deduplication server 100, or content is deleted from the deduplication server 100.

"Used space [MB] of first memory area" indicates a total of a size of a chunk contained in the first chunk management table 1400. "Free space [MB] of first memory area" indicates a space of a free area in the first memory area 20. The statistical values 1902 of the "used space [MB] of first memory area" and "free space [MB] of first memory area" are updated when a chunk is stored in the first memory area 20, or a chunk is deleted from the first memory area 20.

"Used space [MB] of second memory area" indicates a total of a size of a chunk contained in the second chunk management table 1500. "Free space [MB] of second memory area" indicates a space of a free area in the second memory area 30. The statistical values 1902 of the "used space [MB] of second memory area" and "free space [MB] of second memory area" are updated when a chunk is stored in the second memory area 30, or a chunk is deleted from the second memory area 30.

"Used space [MB] of writing buffer area" indicates a total of a size of a chunk stored in the writing buffer area 40 out of the chunks contained in the second chunk management table 1500. "Free space [MB] of writing buffer area" indicates a space of a free area in the writing buffer area 40. The statistical values 1902 of the "used space [MB] of writing buffer area" and "free space [MB] of writing buffer area" are updated when a chunk is stored in the writing buffer area 40, or a chunk is deleted from the writing buffer area 40.

This is the description for various tables in the present embodiment.

FIG. 16 illustrates a displayed example of a display 610 of the management server 600.

The management server 600 displays various statistical information (the statistical information type and statistical value) stored in the statistical information management table 1900 on the display 610 according to an operation of a mouse/keyboard by an administrator.

The flow of various processes executed by the information processing system 1 according to the present embodiment will be described with reference to FIGS. 17 to 25. When the subject is not clearly described in the description below, the subject is the CPU, the controller, or the like. S indicates step. "Y" and "N" respectively indicate "Yes" and "No".

Figure 17:
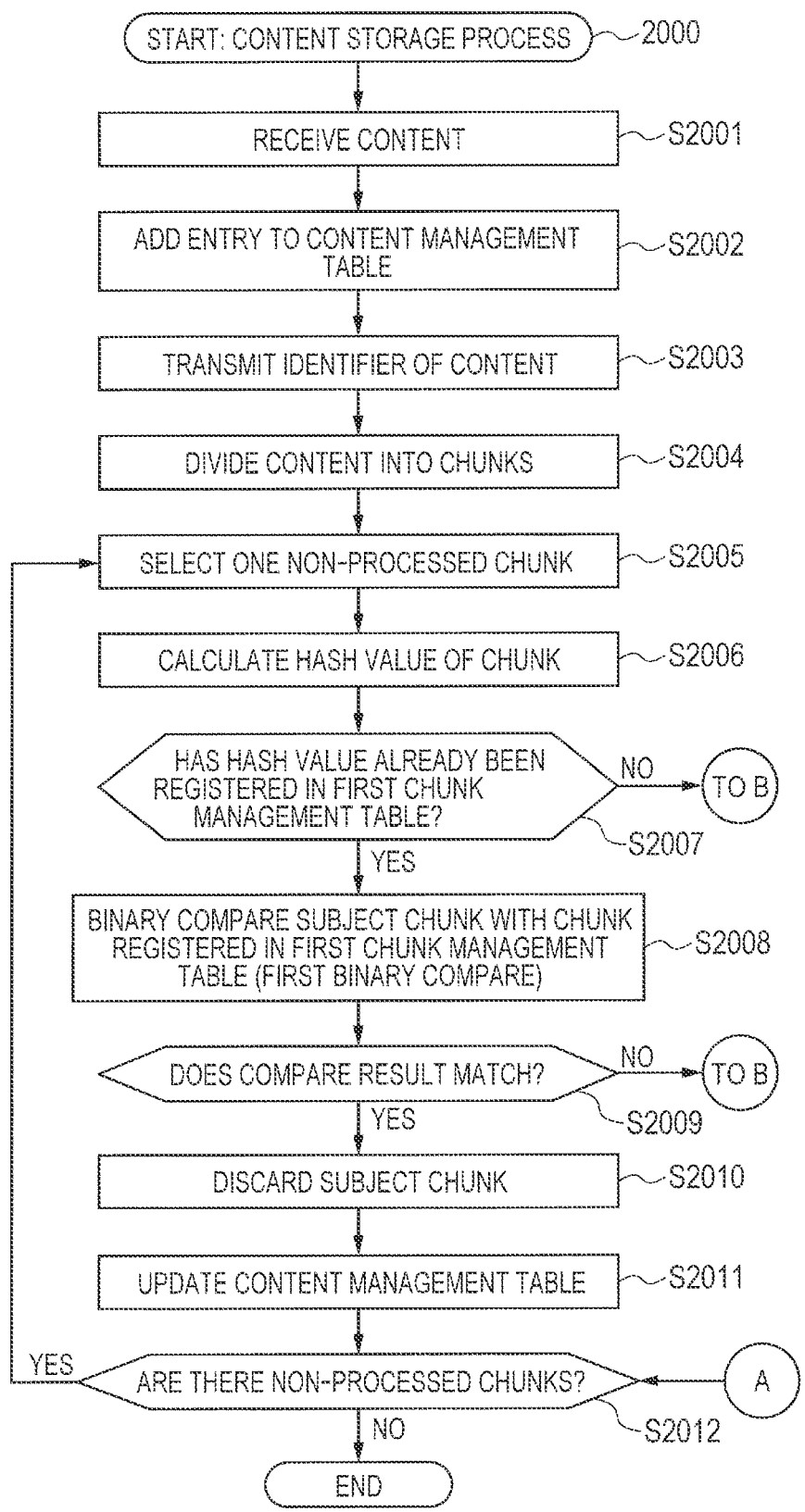
FIG. 17 is a flowchart illustrating a content storage process according to the embodiment of the present invention.
Figure 18:
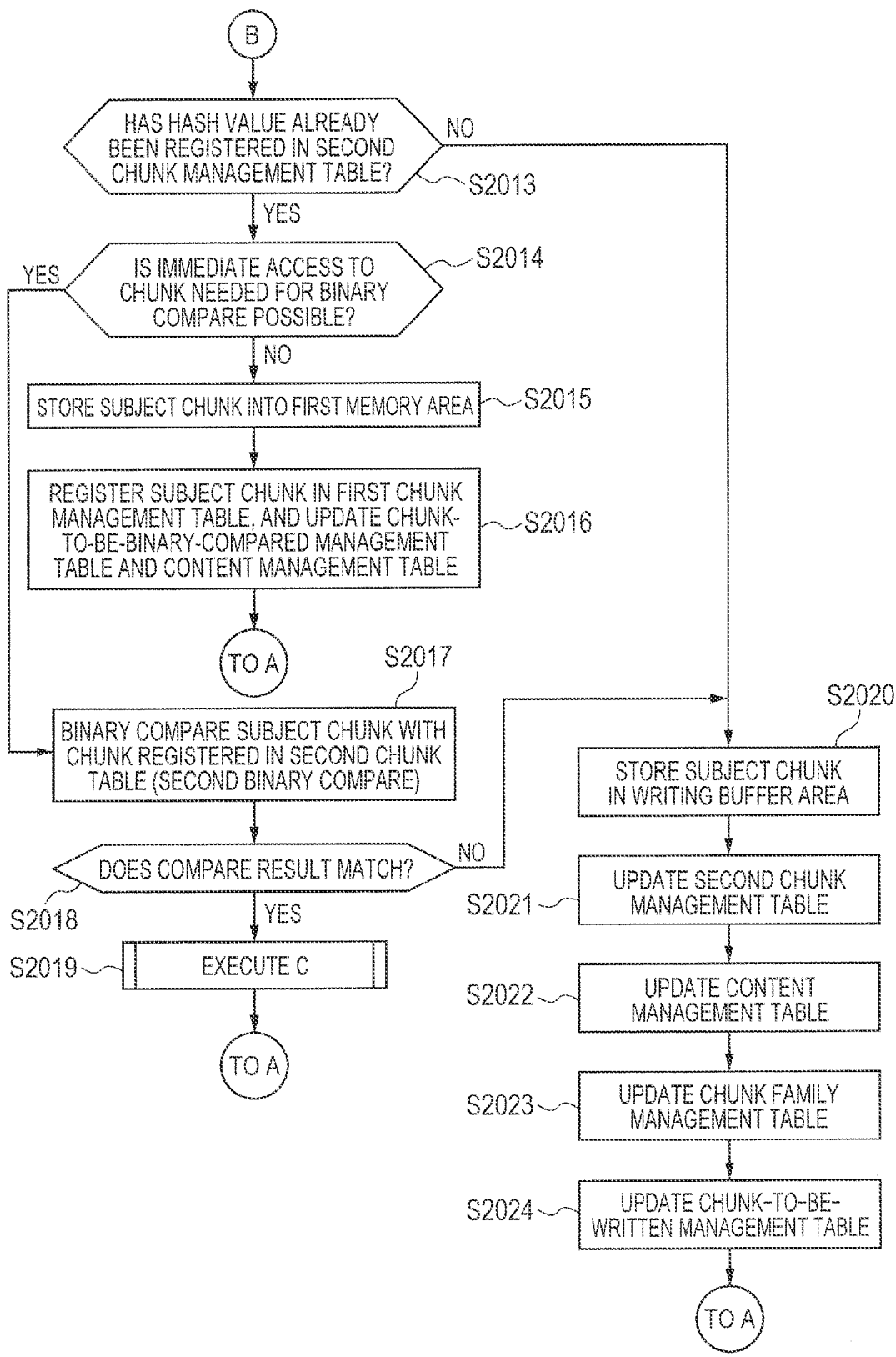
FIG. 18 is a flowchart illustrating a part B in the content storage process according to the embodiment of the present invention.
Figure 19:
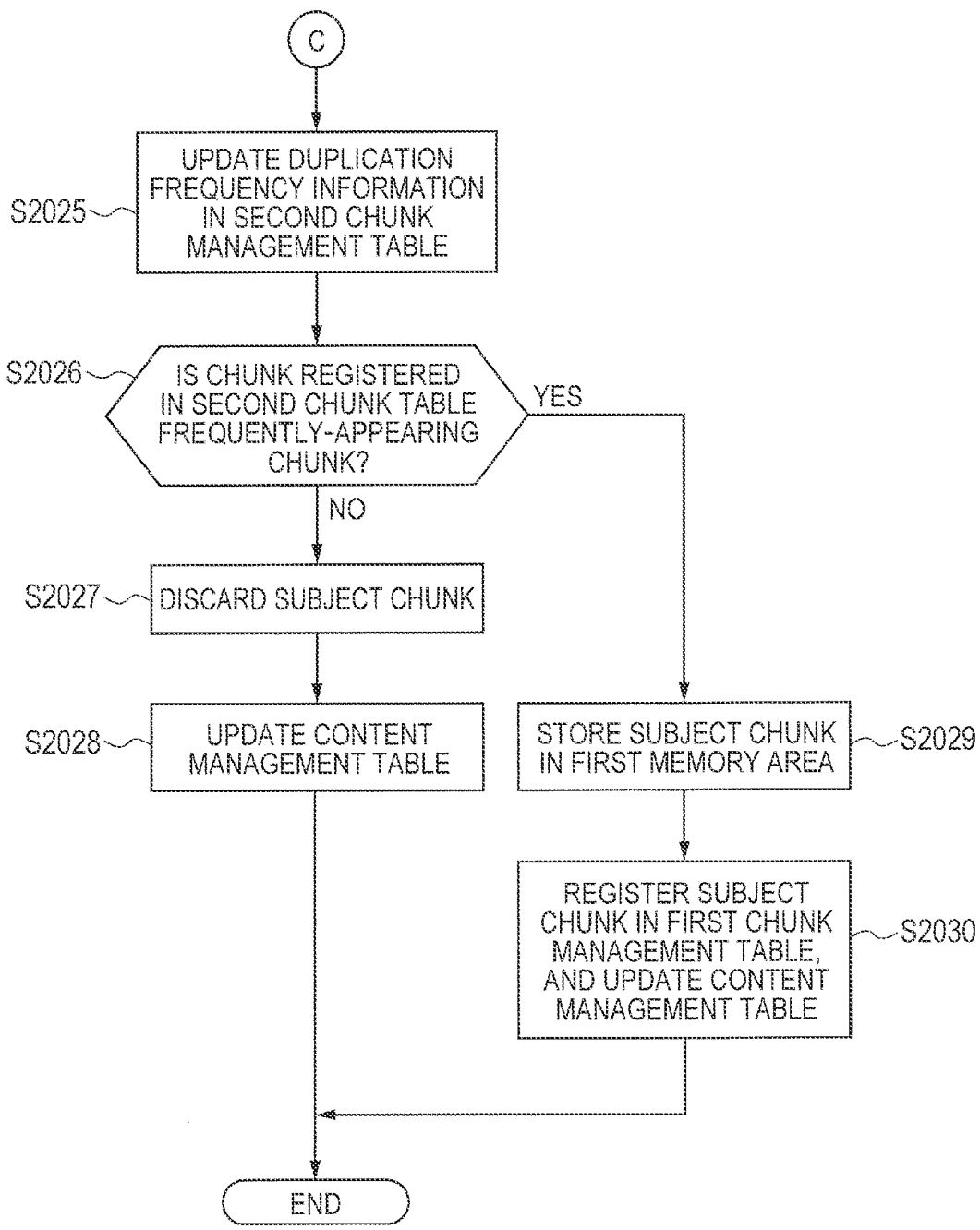
FIG. 19 is a flowchart illustrating a part C in the content storage process according to the embodiment of the present invention.

FIGS. 17 to 19 illustrate one example of a flow of the content storage process 2000.

The content storage process 2000 is a process executed by the deduplication server 100 when the archive server 400 stores content in the deduplication server 100 in the program of the migration process 411.

The deduplication server 100 receives the content to be stored from the archive server 400 in step S2001. The content to be stored is referred to as the subject content below. The deduplication server 100 temporarily stores the subject content in the memory 110. The deduplication server 100 may temporarily store the subject content in the HDD 120 or in the HDD 320, not in the memory 110.

The deduplication server 100 adds a new entry in the content management table 1300 in S2002. The added new entry is referred to as the subject new entry. An identifier that does not coincide with the identifier of the entry that has already been registered is registered in the content #1301 of the subject new entry. An empty list is registered in the constituent chunk list 1302 of the subject new entry. The "NULL" that is an invalid value is registered in the access-required optical-disk number 1303 in the subject new entry.

In S2003, the deduplication server 100 transmits the identifier registered in S2002 to the archive server 400. The archive server 400 receives the transmitted identifier, and registers the received identifier in the content identifier in deduplication server 1003, corresponding to the subject content, of the entry in the file management table 1000.

The deduplication server 100 divides the subject content into one or more chunks in S2004. A size of a fixed length designated beforehand can be used as the size of the chunk, or a size of a variable length adjusting a size of individual chunk according to the subject content can be used.

The deduplication server 100 executes processes in S2005 to S2012 to one or more chunks formed by dividing the subject content. The deduplication server 100 selects non-processed chunk one by one from the head in S2005. The selected chunk is referred to as the subject chunk in the description of the content storage process 2000 below.

The deduplication server 100 calculates the hash value of the subject chunk in S2006.

The deduplication server 100 determines in S2007 whether the calculated hash value has already been registered in the first chunk management table 1400 or not. If the determination result is "N", the deduplication server 100 proceeds to "B" in FIG. 18. This determination result means that the chunk completely matching the subject chunk is not present in the first memory area 20. If the determination result is "Y", the deduplication server 100 proceeds to S2008. This determination result means that the chunk completely matching the subject chunk is likely present in the first memory area 20.

In S2008, the deduplication server 100 executes a first binary compare that is the process of binary comparing the subject chunk and the chunk, corresponding to the hash value that is determined to have already been registered in S2007, in the first memory area 20.

The deduplication server 100 determines whether the result of the first binary compare is a match or not in S2009. If the determination result is "N", the deduplication server 100 proceeds to "B" in FIG. 18. This determination result means that the chunk completely matching the subject chunk is not present in the first memory area 20. If the determination result is "Y", the deduplication server 100 proceeds to S2010. This determination result means that the chunk completely matching the subject chunk is present in the first memory area 20.

The deduplication server 100 discards the subject chunk in S2010.

The deduplication server 100 updates the content management table 1300 in S2011. Specifically, the deduplication server 100 adds the identifier of the chunk, corresponding to the hash value that is determined to have already been registered in S2007, in the first memory area 20 in the constituent chunk list 1302 in the content management table 1300 corresponding to the subject content.

The deduplication server 100 determines whether there are non-processed chunks or not in S2012. If the determination result is "N", the content storage process 2000 is ended. If the determination result is "Y", the deduplication server 100 returns to S2005.

The deduplication server 100 determines in S2013 whether or not the hash value calculated in S2006 has already been registered in the second chunk management table 1500. If the determination result is "N", the deduplication server 100 proceeds to S2020. This determination result means that the chunk completely matching the subject chunk is not present in the second memory area 30. If the determination result is "Y", the deduplication server 100 proceeds to S2014. This determination result means that the chunk completely mating the subject chunk is likely present in the second memory area 30.

The deduplication server 100 determines in S2014 whether the chunk required for the later-described second binary compare can immediately be accessed or not. Specifically, it is determined that the chunk can immediately be accessed ("Y") in case where (1) the storage position information 1503, corresponding to the hash value that is determined to have already been registered in S2013, of the entry in the second chunk management table 1500 indicates the chunk in the writing buffer area 40, or in case where (2) the storage position information 1503 of the same entry indicates the chunk in the optical disk 240, and the storage position 1102, corresponding to this optical disk 240, in the optical disk management table indicates the optical disk drive 220. The other cases mean that this optical disk 240 is stored in the slot 230, so that it is determined that the chunk cannot immediately be accessed ("N"). If the determination result is "Y", the deduplication server 100 proceeds to S2017. If the determination result is "N", the deduplication server 100 proceeds to S2015.

The deduplication server 100 stores the subject chunk in the first memory area 20 in S2015.

In S2016, the deduplication server 100 registers the subject chunk in the first chunk management table 1400, and updates the chunk-to-be-binary-compared management table 1700 and the content management table 1300.

Specifically, the deduplication server 100 adds a new entry in the first chunk management table 1400, and (1) an identifier that does not coincide with the identifiers of the other entries, (2) the hash value calculated in S2006, and (3) the identifier for the storage position into which the subject chunk is stored in S2015 are set respectively in the chunk #1401, the hash value 1402, and the storage position information 1403 of the new entry.

The deduplication server 100 also adds a new entry in the chunk-to-be-binary-compared management table 1700. The deduplication server 100 (1) sets an identifier that does not coincide with the other entries in the ID 1701 of the new entry; (2) sets the identifier of the optical disk 240 into which the chunk, in the second memory area 30, corresponding to the hash value determined to have already been registered in S2013 is stored to the required optical disk 1702 of the new entry; (3) sets the identifier uniquely identifying the chunk stored in the first memory area 20 in S2015 in the deduplication server 100 to the compare-source chunk 1703; and (4) sets the identifier uniquely identifying the chunk, in the second memory area 30, corresponding to the hash value determined to have already been registered in S2013 in the deduplication server 100 to the compare-destination chunk 1704.

The deduplication server 100 also adds an identifier uniquely identifying the chunk stored in the first memory area 20 in S2015 in the deduplication server 100 to the constituent chunk list 1302 in the content management table 1300 corresponding to the subject content. Thereafter, the deduplication server 100 proceeds to "A" in FIG. 17.

In S2017, the deduplication server 100 executes the second binary compare that is a process of binary comparing the subject chunk and the chunk, corresponding to the hash value that is determined to have already been registered in S2013, in the second memory area 30.

The deduplication server 100 determines in S2018 whether the result of the second binary compare in S2017 is a match or not. If the determination result is "Y" (they match), the deduplication server 100 proceeds to S2019. When the determination result is "N" (they do not match), the deduplication server 100 proceeds to S2020.

The deduplication server 100 executes the process "C" in FIG. 19 in S2019.

The deduplication server 100 stores the subject chunk in the writing buffer area 40 in S2020.

The deduplication server 100 updates the second chunk management table 1500 in S2021. Specifically, the deduplication server 100 adds a new entry in the second chunk management table 1500. Then, the deduplication server 100 sets (1) an identifier that does not coincide with the identifiers of the other entries in the second chunk management table 1500, (2) the hash value calculated in S2006, (3) the identifier uniquely identifying the position in the writing buffer area 40 where the subject chunk is stored in S2020, and (4) an initial value "0", respectively, in the chunk #1501, the hash value 1502, the storage position information 1503, and the duplication frequency information 1504 of the new entry.

In steps of the content storage process 2000 described below, the chunk corresponding to the new entry added in S2021 is referred to as a new chunk.

The deduplication server 100 updates the content management table 1300 in S2022. Specifically, the deduplication server 100 adds the identifier of the chunk, in the second memory area 30, corresponding to the hash value determined to have already been registered in S2013 to the constituent chunk list 1302 of the content management table 1300 corresponding to the subject content.

The deduplication server 100 updates the chunk family management table 1600 in S2023. Specifically, the deduplication server 100 specifies the chunk family 5 to which the new chunk belongs by referring to the chunk family management table 1600, the content management table 1300, and the second chunk management table 1500.

If the specified chunk family 5 is not registered in the chunk family management table 1600, the deduplication server 100 adds a new entry to the chunk family management table 1600. Then, the deduplication server 100 (1) sets an identifier uniquely identifying the specified chunk family 5 to the chunk family #1601 of the new entry; (2) adds an identifier uniquely identifying the new chunk in the deduplication server 100 to the belonging chunk list 1602 of the new entry; (3) sets the optical disk #1101 of the optical disk 240 having the smallest optical disk #1101 to the storage optical disk list 1603 of the new entry, out of the optical disks 240 whose free space size 1103 of the optical disk management table 1100 is not less than a threshold value (e.g., 50 [MB]) set beforehand; and (4) sets the size of the new chunk to the total size 1604 of the new entry. If the specified chunk family 5 is registered in the chunk family management table 1600, the identifier uniquely identifying the new chunk in the deduplication server 100 is added to the belonging chunk list 1602 of the entry corresponding to the subject chunk family 5, and adds the size of the new chunk to the total size 1604. The deduplication server 100 sets, to the storage optical disk list 1603, the list (referred to as a first list) of the optical disk 240 into which the chunks contained in the belonging chunk list 1602 are stored, or when the free space size of all optical disks 240 included in the first list is not more than a threshold value (e.g., 100 [MB]) set beforehand, sets a list (second list) formed by adding the identifier of the later-described added optical disk to the first list. As the added optical disk, the optical disk 240 having the smallest optical disk #1101 out of the optical disks 240 whose free space size 1103 in the optical disk management table 1100 is not less than the threshold value (e.g., 50 [MB]) set beforehand can be used.

The deduplication server 100 updates the chunk-to-be-written management table 1800 in S2024. Specifically, the deduplication server 100 adds a new entry to the chunk-to-be-written management table 1800. The deduplication server 100 then sets (1) an identifier that does not coincide with the identifiers in the chunk-to-be-written management table 1800, (2) an identifier uniquely identifying the new chunk in the deduplication server 100, and (3) the optical disk #1101 of the optical disk 240 having the smallest free space size 1103, out of the optical disks 240, contained in the storage optical disk list 1603 in the chunk family management table 1600 and corresponding to the chunk family 5 to which the new chunk belongs, to the ID 1801, the write-destination optical disk #1802, and the written chunk 1803 of the new entry, respectively. Then, the deduplication server 100 proceeds to "A" in FIG. 17.

The deduplication server 100 updates the duplication frequency information 1504 of the second chunk management table 1500 in S2025. Specifically, the deduplication server 100 increments the duplication frequency information 1504 of the entry, in the second chunk management table 1500, corresponding to the hash value that is determined to have already been registered in S2013, by only 1.

The deduplication server 100 determines in S2016 whether or not the chunk registered in the second chunk management table 1500 is a frequently-appearing chunk. Specifically, if the duplication frequency information 1504 of the entry, in the second chunk management table 1500, corresponding to the hash value that is determined to have already been registered in S2013 is larger than a threshold value (e.g., ten times) set beforehand by the administrator, the deduplication server 100 determines that it is the frequently-appearing chunk ("Y"), and if not, the deduplication server 100 determines that it is not the frequently-appearing chunk ("N"). If the determination result is "Y", the deduplication server 100 proceeds to S2029, and if the determination result is "N", the deduplication server 100 proceeds to S2027. The deduplication server 100 discards the subject chunk in S2027.

The deduplication server 100 updates the content management table 1300 in S2028. Specifically, the deduplication server 100 adds the identifier of the chunk, in the second memory area 30, corresponding to the hash value that is determined to have already been registered in S2013 to the constituent chunk list 1302 in the content management table 1300 corresponding to the subject content, and ends the process "C" in FIG. 19.

The deduplication server 100 executes the processes same as those in S2015 and S2016 in S2029 and S2030 respectively. Thereafter, the process "C" in FIG. 19 is ended.

In S2026 to S2029, the frequently-appearing chunk is stored in the first memory area 20, and the chunk (matching chunk) completely matching the frequently-appearing chunk is discarded by the first deduplication afterward. Therefore, the second deduplication does not have to be performed to the matching chunk, whereby the overhead in the deduplication process in the present embodiment can be reduced.

Figure 20:
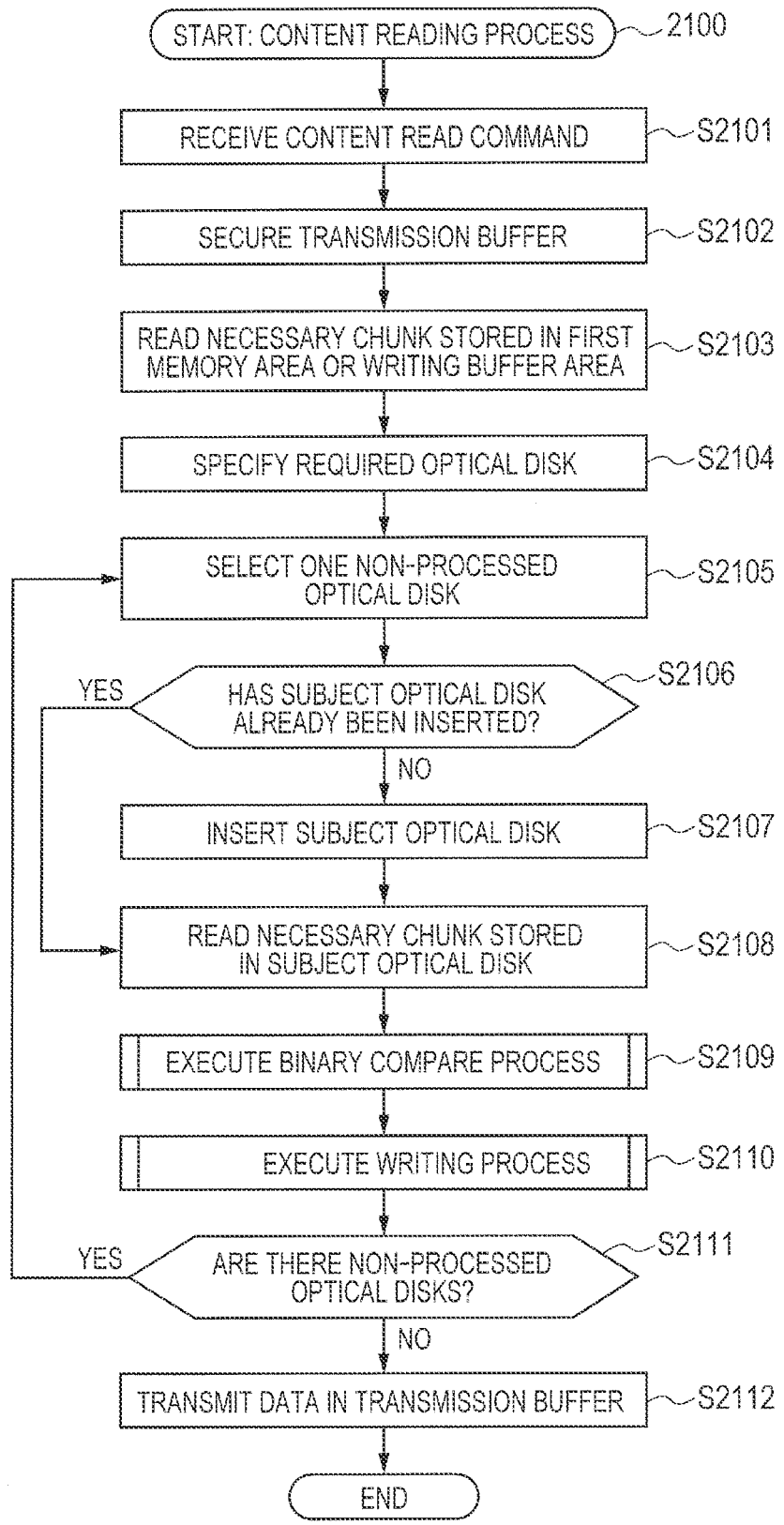
FIG. 20 is a flowchart illustrating a content reading process according to the embodiment of the present invention.

FIG. 20 illustrates one example of a flow of the content reading process 2100.

In the content reading process 2100, the deduplication server 100 reads the chunk forming the content that is required to be read from the first memory area 20 and the second memory area 30, reconstructs the content, and transmits the reconstructed content to the source that issues the read command. When reading the chunk forming the content that is required to be read from the optical disk 240 in the second memory area 30, the deduplication server 100 executes (1) the second binary compare designated by the entry of the chunk-to-be-binary-compared management table 1700, and (2) the writing process designated by the entry of the chunk-to-be-written management table 1800, the second binary compare and the writing process being involved with the subject optical disk 240.

The deduplication server 100 receives the read command of the content from the archive server 400 in S2101. The read command includes the content #1301 of the content to be read. The content to be read is referred to as the subject content below.

The deduplication server 100 secures the transmission buffer, used for transmitting the subject content, in the memory 110 of the deduplication server 100 in S2102. The transmission buffer may be secured in the HDD 120 or in the HDD 320. The size of the content to be read is used as the size of the transmission buffer.

In S2013, the deduplication server 100 reads the necessary chunk stored in the first memory area 20 or the writing buffer 40, and writes the read chunk into the secured transmission buffer. Specifically, the deduplication server 100 firstly specifies the chunk (referred to as the necessary chunk) necessary for the reconstruction of the subject content by referring to the constituent chunk list 1302, in the content management table 1300, corresponding to the subject content. Then, the deduplication server 100 specifies the chunk stored in the first memory area 20 from the specified necessary chunks by referring to the first chunk management table 1400, reads the specified chunk from the first memory area 20, and writes the read chunk into a suitable position in the transmission buffer. Next, the deduplication server 100 specifies the chunk stored in the writing buffer area 40 from the specified necessary chunks by referring to the second chunk management table

1500, reads the specified chunk from the writing buffer area 40, and writes the read chunk in a suitable position in the transmission buffer.

The deduplication server 100 specifies the optical disk (referred to as the required optical disk) required for the reconstruction of the subject content in S2104. Specifically, the deduplication server 100 specifies one or more optical disks 240 into which the necessary chunk is stored by referring to the second chunk management table 1500.

Next, the deduplication server 100 executes the processes in S2105 to S2111 to the required optical disk.

The deduplication server 100 selects one non-processed optical disk from the required optical disks in S2105. The selected optical disk is referred to as the subject optical disk.

The deduplication server 100 determines in S2106 whether the subject optical disk has already been inserted or not in S2106. Specifically, the deduplication server 100 refers to the storage position, in the optical disk management table 1100, corresponding to the subject optical disk. If the storage position 1102 is the optical disk drive 220, the deduplication server 100 determines that the subject optical disk has already been inserted ("Y"), and if the storage position 1102 is the slot 230, the deduplication server 100 determines that the optical disk has not yet been inserted ("N"). If the determination result is "Y", the deduplication server 100 proceeds to S2108, and if "N", the deduplication server 100 proceeds to S2107.

The deduplication server 100 inserts the subject optical disk into the optical disk drive 220 from the slot 230 in S2107.

In S2108, the deduplication server 100 reads the chunk contained in the subject optical disk out of the necessary chunks, and writes the read chunk into the transmission buffer. Specifically, the deduplication server 100 specifies the chunk contained in the subject optical disk out of the necessary chunks by referring to the storage position information 1503 of the second chunk management table 1500, reads the specified chunk from the subject optical disk, and writes the read chunk in a suitable position in the transmission buffer.

Figure 21:
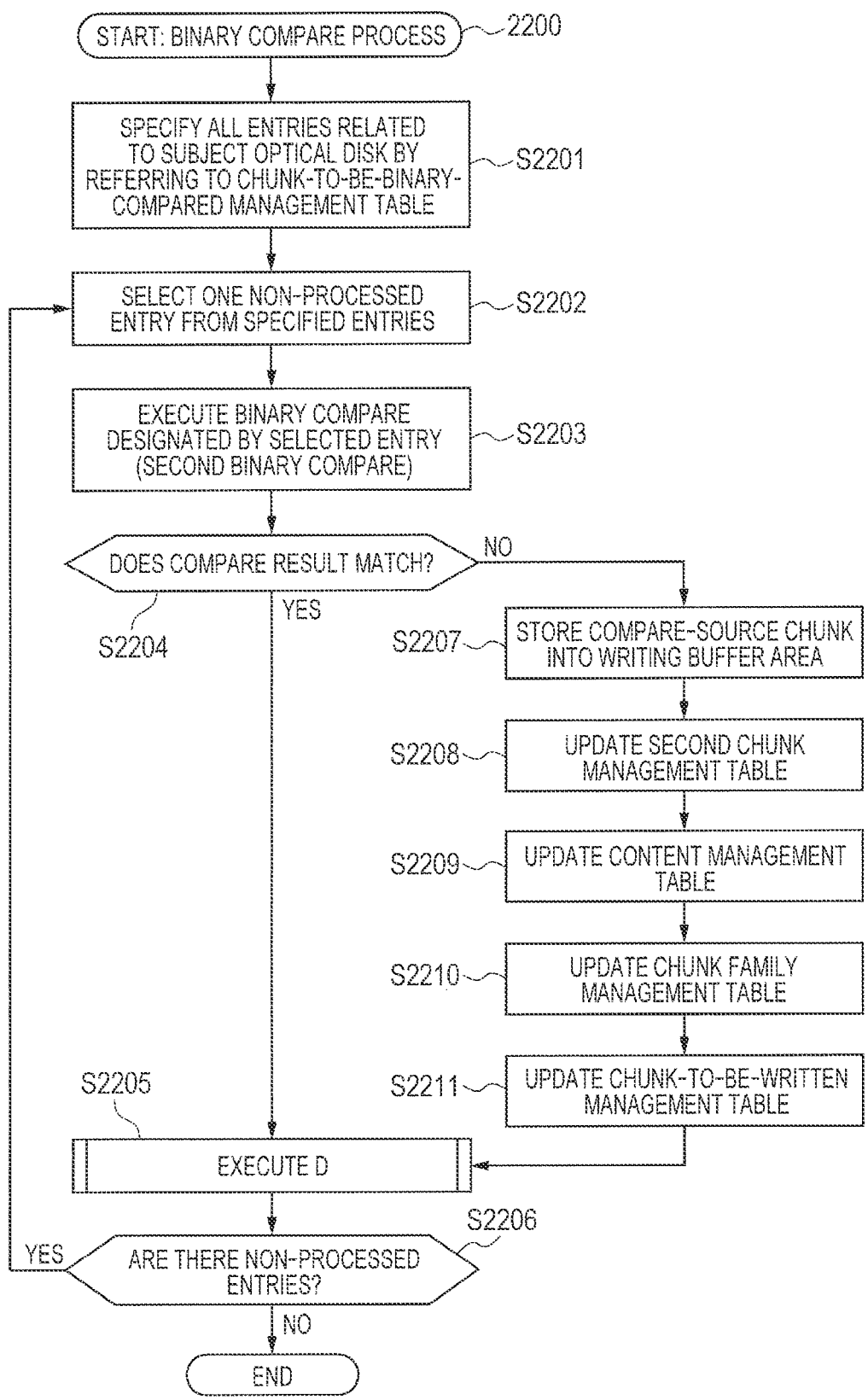
FIG. 21 is a flowchart illustrating a binary compare process according to the embodiment of the present invention.
Figure 22:
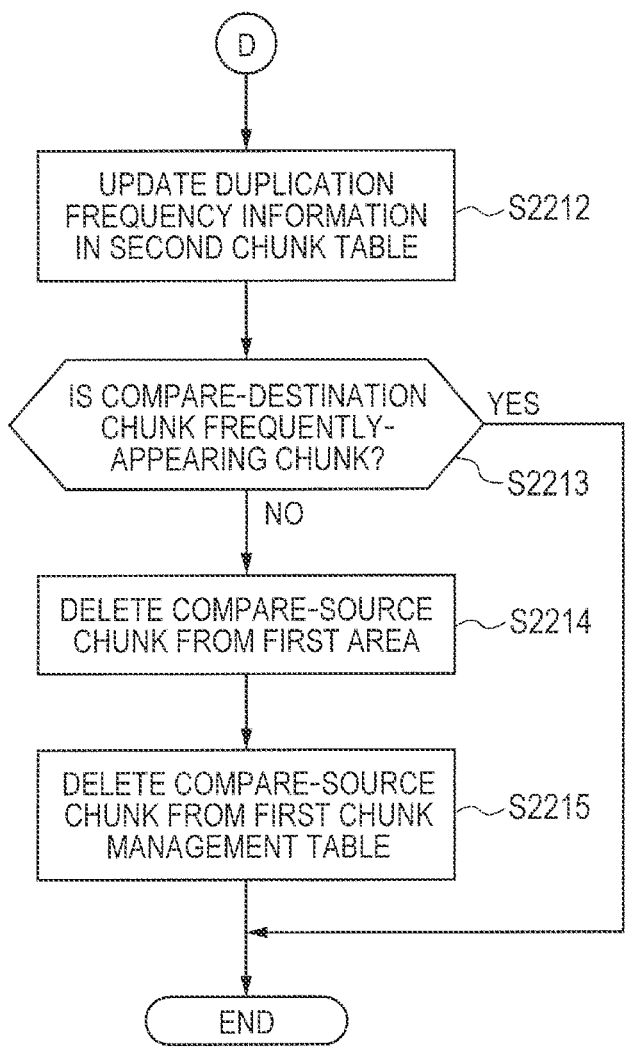
FIG. 22 is a flowchart illustrating a part D in the binary compare process according to the embodiment of the present invention.

The deduplication server 100 executes the binary compare process 2200 in FIGS. 21 and 22 in S2109.

Figure 23:
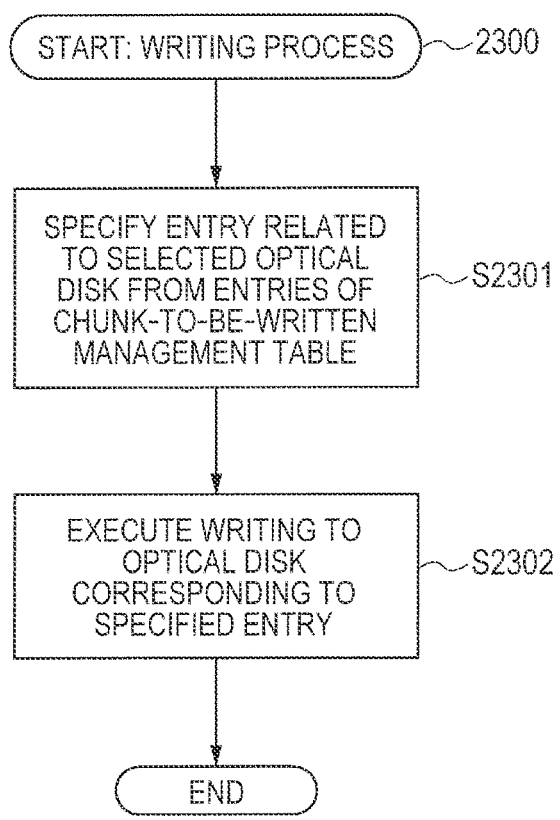
FIG. 23 is a flowchart illustrating a writing process according to the embodiment of the present invention.

The deduplication server 100 executes the writing process 2300 in FIG. 23 in S2110.

The deduplication server 100 determines in S2111 whether there are non-processed optical disks or not. If there are non-processed optical disks ("Y"), the deduplication server 100 proceeds to S2105, and if there is no non-processed optical disk ("N"), the deduplication server 100 proceeds to S2112.

The deduplication server 100 transmits the data of the subject content in the transmission buffer to the source that issues the read command of the content in S2112, and ends the content reading process 2100.

FIGS. 21 and 22 illustrate one example of the flow of the binary compare process 2200.

In the binary compare process 2200, the second binary compare involved with the subject optical disk is executed, out of the second binary compare designated by the chunk-to-be-binary-compared management table 1700. According to the binary compare process 2200, the second binary compare that is postponed in S2015 and S2016 in the content storage process 2000 is executed.

In S2201, the deduplication server 100 specifies the entry, in the chunk-to-be-binary-compared management table 1700, in which the required optical disk #1702 matches the identifier of the subject optical disk by referring to the required optical disk #1702 in the chunk-to-be-binary-compared management table 1700.

The deduplication server 100 executes the processes in S2202 to S2211 to the entry specified in S2201.

In S2202, the deduplication server 100 selects one non-processed entry from the entries specified in S2201.

In steps below, the chunks designated by the compare-source chunk 1703 and designated by the compare-destination chunk 1704 of the entry selected in S2202 are respectively referred to as a compare-source chunk and a compare-destination chunk.

In S2203, the deduplication server 100 executes the second binary compare designated by the selected entry. Specifically, the deduplication server 100 executes the binary compare to the compare-source chunk and the compare-destination chunk.

In S2204, the deduplication server 100 determines whether the result of the binary compare in S2203 is a match or not. When the determination result is the match ("Y"), the deduplication server 100 proceeds to S2205, and if the determination result is not the match ("N"), the deduplication server 100 proceeds to S2207.

The deduplication server 100 executes the process "D" in FIG. 22 in S2205.

The deduplication server 100 determines in S2206 whether there are non-processed entries or not. When there are non-processed entries ("Y"), the deduplication server 100 proceeds to S2202, and there is no non-processed entry ("N"), the binary compare process 2200 is ended.

In S2207 and S2208, the deduplication server 100 executes the processes same as those in S2020 and S2021. Notably, the "subject chunk" in S2020 and S2021 is necessarily changed to the "compare-source chunk".

In S2209, the deduplication server 100 updates the content management table 1300. Specifically, the deduplication server 100 replaces the identifier of the compare-source chunk in the entry containing the identifier of the compare-source chunk in the constituent chunk list 1302, out of the entries in the constituent chunk list 1302 in the content management table 1300, by the identifier for the chunk stored in the writing buffer area 40 in S2207. The process in S2209 means the update of the content management table 1300 caused by the transition of the storage position of the compare-source chunk from the first memory area 20 to the writing buffer area 40.

In S2210 and S2211, the deduplication server 100 executes the processes same as those in S2023 and S2024. Notably, the "new chunk" in S2210 and S2211 is necessarily changed to the "chunk stored in the writing buffer area 40 in S2207". Thereafter, the deduplication server 100 proceeds to S2205.

The deduplication server 100 updates the duplication frequency information 1504 in the second chunk management table 1500 in S2212. Specifically, the deduplication server 100 increments the value of the duplication frequency information 1504, in the second chunk management table 1500, corresponding to the chunk stored in the writing buffer area 40 in S2207 by only 1.

The deduplication server 100 determines in S2213 whether the compare-source chunk is a frequently-appearing chunk or not. Specifically, if the duplication frequency information 1504, in the second chunk management table 1500, corresponding to the chunk stored in the writing buffer area 40 in S2207 is larger than a threshold value (e.g., ten times) set beforehand, the deduplication server 100 determines that it is the frequently-appearing chunk ("Y"), and if not, the deduplication server 100 determines that it is not the frequently-appearing chunk ("N"). If the determination result is "Y", the deduplication server 100 ends the process "D" in FIG. 22, and if the determination result is "N", the deduplication server proceeds to S2214.

In S2214, the deduplication server 100 deletes the compare-source chunk from the first memory area 20.

In S2215, the deduplication server 100 deletes the entry, in the first chunk management table 1400, corresponding to the compare-source chunk, and ends the process "D" in FIG. 22.

In S2212 to S2215, the deduplication server 100 does not delete the frequently-appearing chunk from the first memory area 20. Therefore, the chunk (referred to as a matching chunk) completely matching the frequently-appearing chunk is discarded by the first deduplication, whereby the second deduplication does not have to be performed to the matching chunk. Consequently, the overhead in the deduplication process in the present embodiment can be reduced.

FIG. 23 illustrates one example of a flow of the writing process 2300.

In the writing process 2300, the writing of the chunk in the writing buffer area 40 to the optical disk 240 is executed, this writing being postponed in the content storage process 2000 and the binary compare process 2200.

In S2301, the deduplication server 100 specifies an entry involved with the optical disk 240 selected in S2105, out of the entries in the chunk-to-be-written management table 1800.

In S2302, the deduplication server 100 performs the writing to the optical disk corresponding to the specified entry. Specifically, the deduplication server 100 writes the chunk, in the writing buffer area 40, designated by the written chunk 1803 of the specified entry to the optical disk 240 selected in S2105. The deduplication server 100 deletes the specified entry from the chunk-to-be-written management table 1800, and deletes the entry, in the second chunk management table 1500, corresponding to the written chunk.

Figure 24:
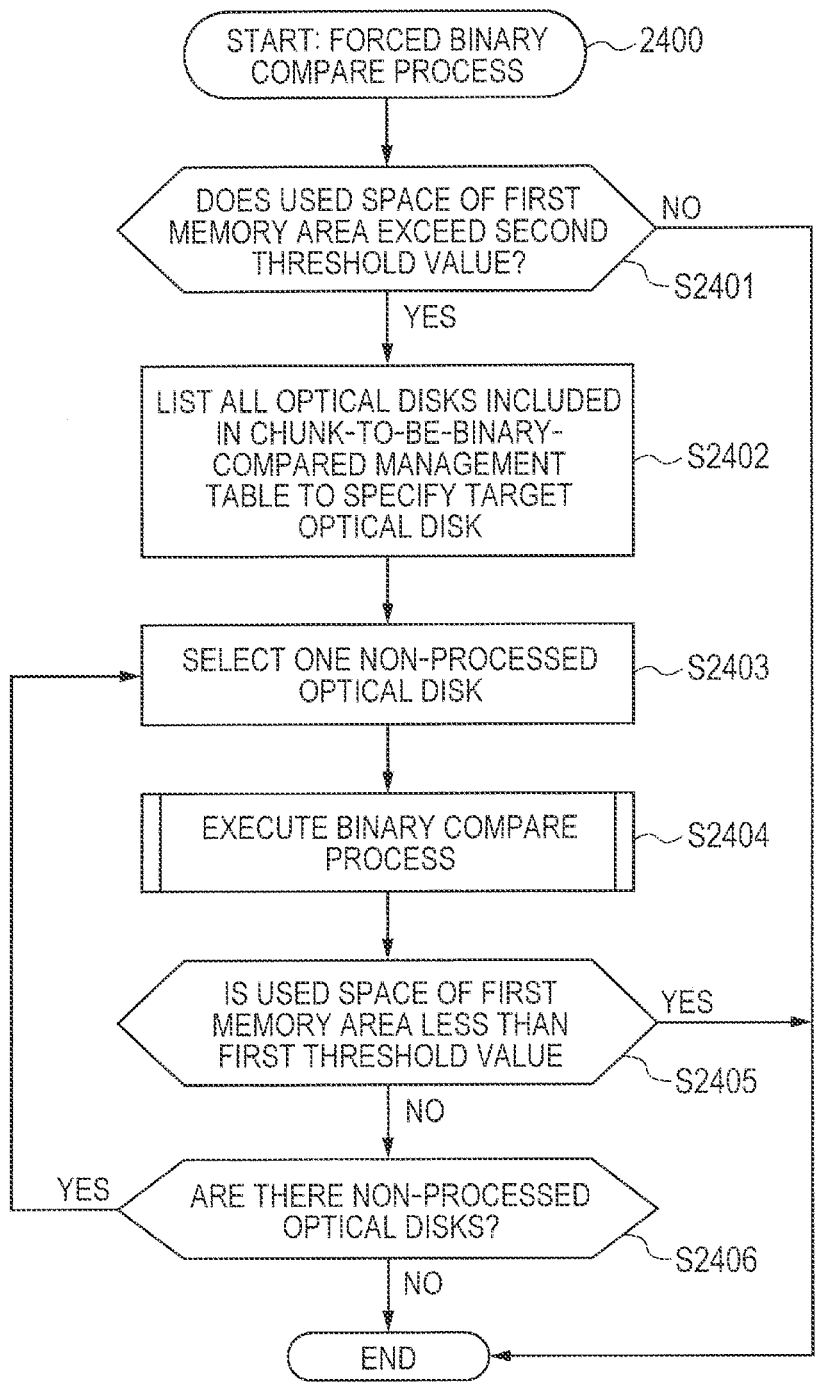
FIG. 24 is a flowchart illustrating a forced binary compare process according to the embodiment of the present invention.

FIG. 24 illustrates one example of the flow of the forced binary compare process 2400.

The forced binary compare process 2400 is a process in which the second binary compare designated by the entry in the chunk-to-be-binary-compared management table 1700 is forcibly executed to reduce the volume of chunks accumulated in the first memory area 20. The deduplication server 100 controls the volume of the chunks to be deleted by using two threshold values satisfying later-described "first threshold value [MB]<second threshold value [MB]". The forced-binary compare process 2400 is periodically (e.g., once a day) started.

In S2401, the deduplication server 100 refers to the statistical value 1902 of the "used space [MB] of first memory area" in the statistical information management table 1900 so as to determine whether the statistical value 1902 of the "used space [MB] of first memory area" exceeds the second threshold value [MB] set beforehand or not. If it exceeds ("Y"), the deduplication server 100 proceeds to S2402, and if not, the deduplication server 100 ends the forced binary compare process 2400.

In S2402, the deduplication server 100 specifies the optical disk necessary for the forced binary compare process 2400. Specifically, the deduplication server 100 lists all optical disks 240 contained in the required optical disk #1702 in the chunk-to-be-binary-compared management table 1700. The listed optical disk 240 is referred to as the target optical disk.

Next, the deduplication server 100 executes the processes in S2403 to S2406 to the target optical disk.

In S2403, the deduplication server 100 selects one non-processed optical disk 240 from the target optical disks. The selected optical disk 240 is referred to as the subject optical disk.

In S2404, the deduplication server 100 executes the binary compare process, which is described above, to the subject optical disk.

In S2405, the deduplication server 100 refers to the statistical value 1902 of the "used space [MB] of first memory area" in the statistical information management table 1900 so as to determine whether the statistical value 1902 of the "used space [MB] of first memory area" is less than the first threshold value [MB] set beforehand or not. If it is less than the first threshold value ("Y"), the deduplication server 100 ends the forced binary compare process 2400, and if not, the deduplication server 100 proceeds to S2406.

In S2406, the deduplication server 100 determines whether or not there are non-processed optical disks. When there are non-processed optical disks ("Y"), the deduplication server 100 proceeds to S2403, and when there is no non-processed optical disk ("N"), the deduplication server 100 ends the forced binary compare process 2400.

Figure 25:
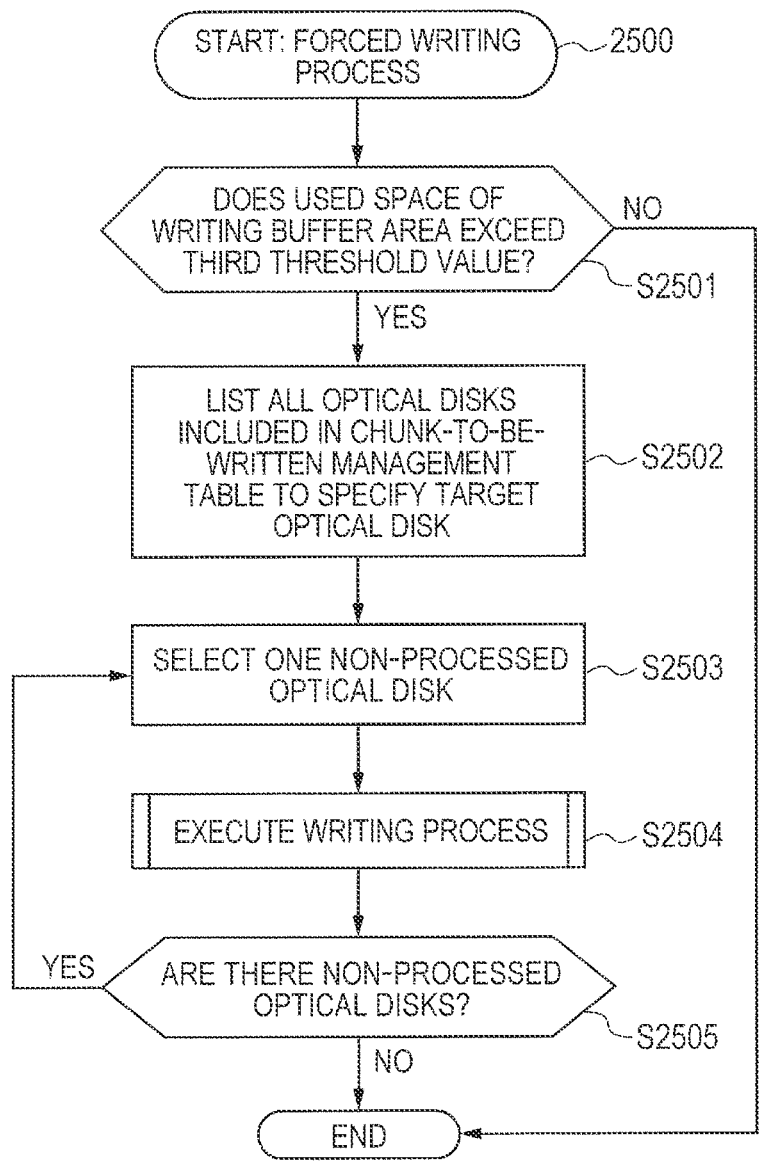
FIG. 25 is a flowchart illustrating a forced writing process according to the embodiment of the present invention.

FIG. 25 illustrates one example of the flow of the forced writing process 2500.

The forced writing process 2500 is a process in which the writing designated by the entry of the chunk-to-be-written management table 1800 is forcibly executed to reduce the volume of the chunks accumulated in the writing buffer area 40. The deduplication server 100 determines whether or not it is necessary to reduce the volume of the chunks by using a later-described third threshold value [MB]. The forced writing process 2500 is periodically (e.g., once a day) started.

In S2501, the deduplication server 100 refers to the statistical value 1902 of the "used space [MB] of writing buffer area" in the statistical information management table 1900 so as to determine whether the statistical value 1902 of the "used space [MB] of writing buffer area" exceeds the third threshold value [MB] set beforehand or not. If it exceeds ("Y"), the deduplication server 100 proceeds to S2502, and if not, the deduplication server 100 ends the forced writing process 2500.

In S2502, the deduplication server 100 lists all optical disks 240 contained in the write-destination optical disk #1802 in the chunk-to-be-written management table 1800. The listed optical disk 240 corresponding to the write-destination optical disk #1802 is referred to as the target optical disk.

Next, the deduplication server 100 executes the processes in S2503 to S2505 to the target optical disk.

In S2503, the deduplication server 100 selects one non-processed optical disk 240 from the target optical disks. The selected optical disk 240 is referred to as the subject optical disk.

In S2504, the deduplication server 100 executes the writing process, which is described with reference to FIG. 23, to the subject optical disk. Notably, the "optical disk 240 selected in S2105" in the description for FIG. 23 has to be changed to the "subject optical disk".

In S2505, the deduplication server 100 determines whether or not there are non-processed optical disks in the target optical disks. When there are non-processed optical disks ("Y"), the deduplication server 100 proceeds to S2503, and when there is no non-processed optical disk ("N"), the deduplication server 100 ends the forced writing process 2500.

Figure 26:
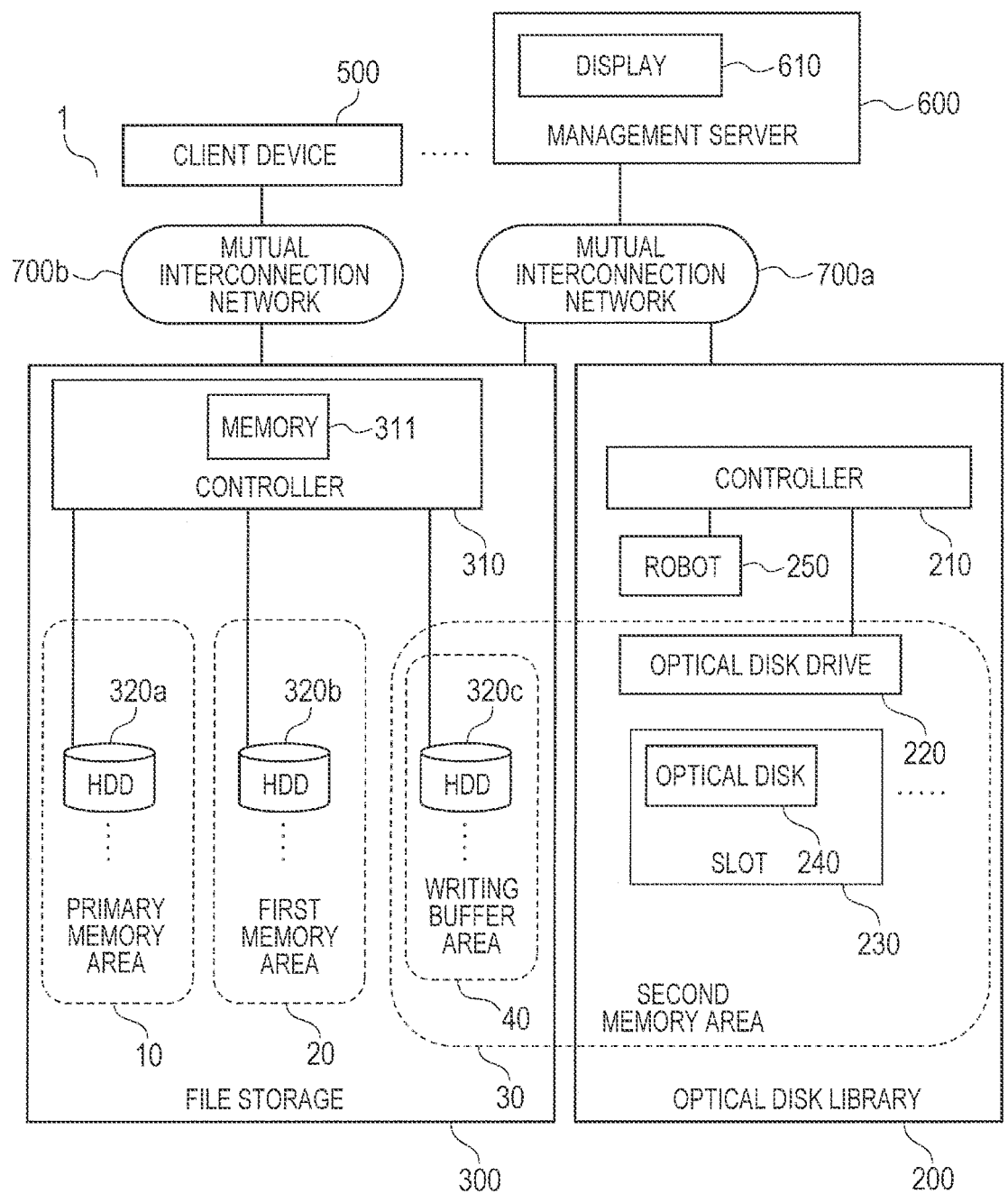
FIG. 26 is a diagram illustrating an overall configuration of an information processing system according to a second embodiment of the present invention.
Figure 27:
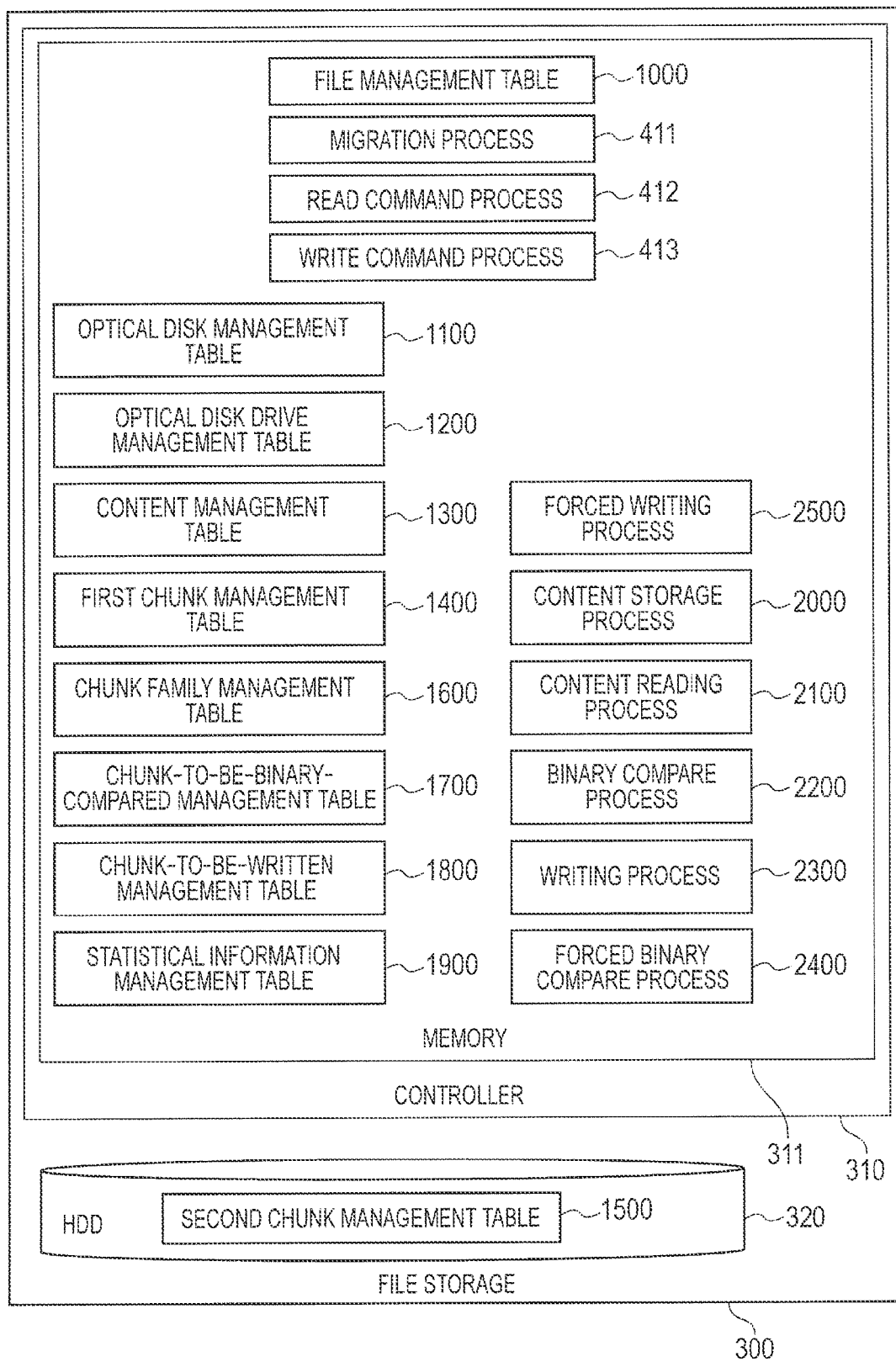
FIG. 27 is a diagram illustrating an example of structures of a memory of a controller in a file storage, and HDD in the file storage according to the second embodiment of the present invention.

A second embodiment will be described below. FIGS. 26 and 27 are diagrams illustrating an information processing system according to the second embodiment.

FIG. 26 illustrates an information processing system 1 according to the second embodiment. The information processing system 1 according to the second embodiment does not have the deduplication server 100 and the archive server 400, different from the first embodiment. The process executed by the deduplication server 100 and the archive server 400 in the first embodiment is executed by the file storage 300 in the second embodiment.

FIG. 27 illustrates various tables on a memory 311 and on a HDD 320, and various programs on the memory 311 in the second embodiment. The memory 311 in the second embodiment stores the tables and programs stored on the memory 410 of the archive server 400 in the first embodiment, and the tables and programs stored on the memory 110 of the duplication server 100 in the first embodiment.

The tables on the memory 311 and on the HDD 320 in the second embodiment may be stored on the optical disk 240, the HDD 320, and the memory in the controller 210, or in the HDD in the controller 210.

Figure 28:
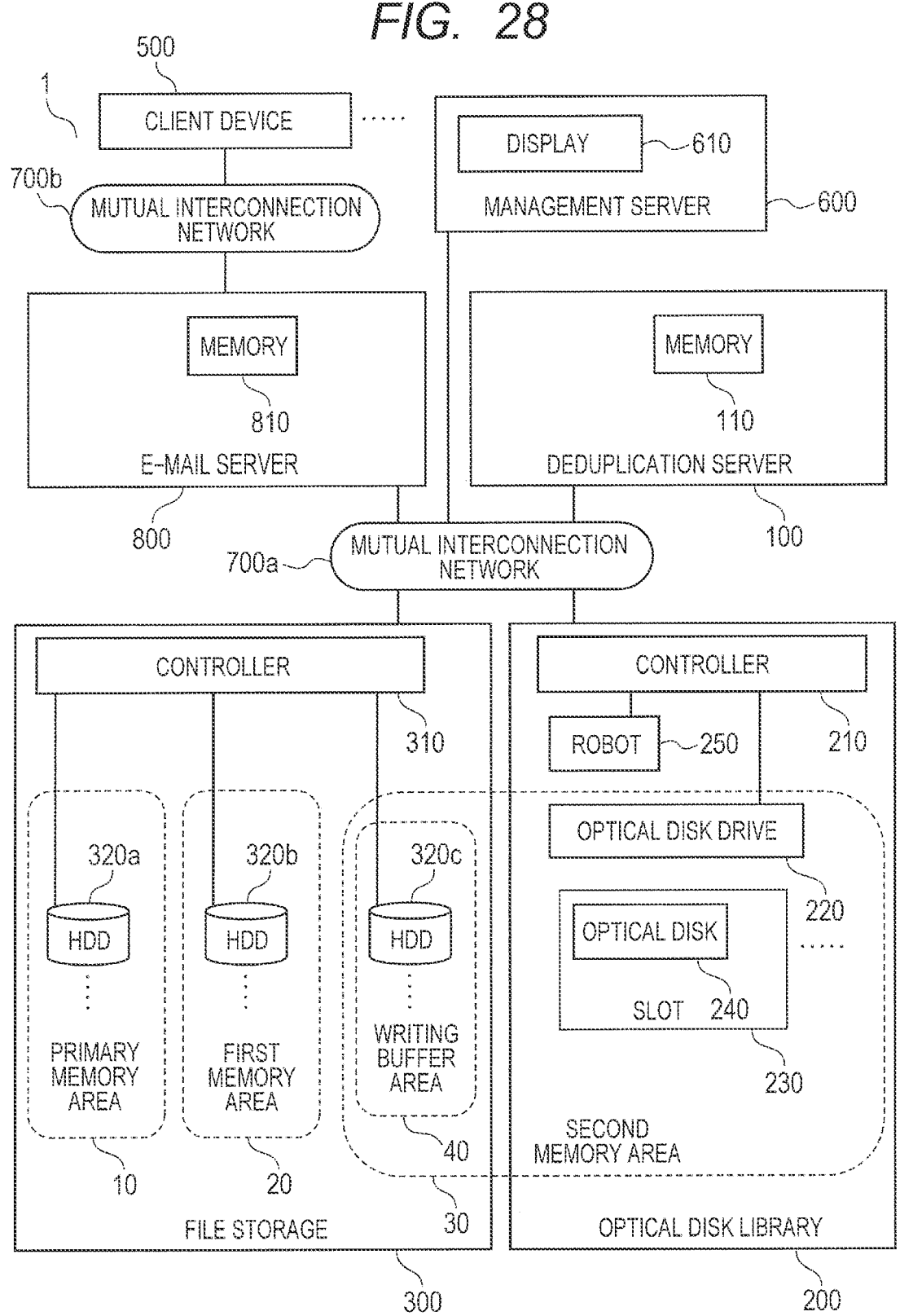
FIG. 28 is a diagram illustrating an overall configuration of an information processing system according to a third embodiment of the present invention.
Figure 29:
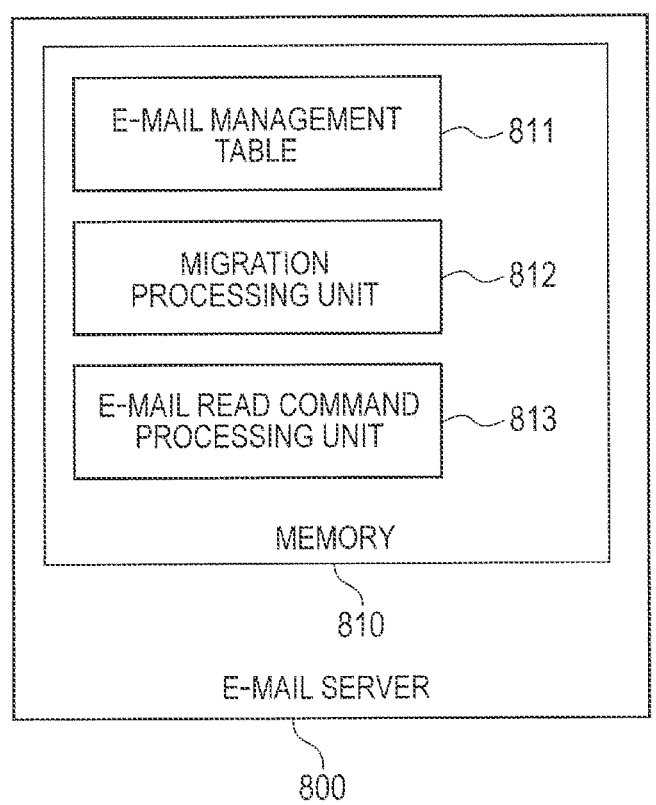
FIG. 29 is a view illustrating an example of a structure of a memory in an archive server according to the third embodiment of the present invention.

A third embodiment will be described below. FIGS. 28 and 29 are diagrams illustrating an information processing system according to the third embodiment.

FIG. 28 illustrates an information processing system 1 according to the third embodiment. The information processing system 1 according to the third embodiment is almost the same as the information processing system 1 in the first embodiment, except that an e-mail server 800 is provided instead of the archive server 400 in the first embodiment. The information processing system 1 according to the third embodiment reads an e-mail message from the e-mail server 800 to the client device 500, and transmits the e-mail message from the e-mail server 800, by use of the e-mail server 800. The e-mail message is stored in the primary memory area 10 in the file storage 300.

FIG. 29 is a view illustrating a table and various programs on a memory of the e-mail server 800. The memory 810 stores a table such as an e-mail management table 811, and programs such as a migration process 812 and an e-mail read command process 813. The e-mail management table 811 is a table for managing the e-mail message in the information processing system 1. The program of the migration process 812 is for transferring (migrating) the outdated message, out of the e-mail messages stored on the primary memory area 10, to the first memory area 20 or the second memory area 30. The operation of the migration process 812 is almost the same as the migration process 411, except that the data handled by the program of the migration process 812 is not a file but an e-mail message. The program of the e-mail read command process 813 is for transmitting the e-mail message to the client device 500 according to the e-mail message read command from the client device 500. The operation of the e-mail read command process 813 is almost the same as the read command process 412, except that the data handled by the e-mail read command process 813 is not a file but an e-mail message.

This is the description of the preferred embodiments of the present invention. These embodiments are illustrative of the present invention, and they are not construed to limit the scope of the present invention. The present invention can be embodied in various other forms.

For example, the optical disk library in the present invention may be replaced by a tape library. Furthermore the processes (C1) and (C2) that are the first deduplication in the deduplication process in the embodiments of the present invention described with reference to FIG. 31 can be skipped (this means that the process "B" in FIG. 18 is executed instead of the processes in S2007 to S2010 in FIG. 17). In this case, the volume of chunk that becomes the subject of the second deduplication might be increased. On the other hand, even in this case, the second binary compare is postponed, and executed in the content reading process, whereby the number of times of inserting the optical disk can be reduced.

For example, supposing that the probability of the match between the hash values of two different chunks is very low to be negligible in reality, the first binary compare in (C2) in FIG. 31 and the second binary compare in (D2) can be skipped. In this case, the processes (C2) and (D2) in FIG. 31 are not executed. In the process (C3) in FIG. 31, (1) when the hash value matching the hash value of the chunk to be processed is found, the chunk to be processed is discarded, and the process to the next chunk is started, and (2) when the hash value matching the hash value of the chunk to be processed is not found, the chunk to be processed is stored in the writing buffer, and the process to the next chunk is started. Specifically, this means that only the writing of the chunk to be processed into the optical disk is postponed. The postponed writing to the optical disk is executed in (D3) in FIG. 31. The number of times of inserting the optical disk into the optical disk drive can be reduced by postponing the writing to the optical disk.

For example, the optical disk library in the present invention may be replaced by a MAID (Massive Arrays of Inactive Disks) storage which has a feature controlling rotation of spindles in HDD per RAID group for purposes such as low power consumption. In this case, "an optical disk" corresponds to "a RAID group", and it is needed to replace "insertion of the optical disk to the optical disk drive" to "spin-up of HDD in a RAID group", and "ejection of an optical disk from an optical disk drive" to "spin-down of HDD in a RAID group" respectively.

For example, the optical disk library in the present invention may be replaced by a file storage of which performance (through-put performance, response performance) is lower than file storage 300, and a memory medium of the file storage needs not necessarily to be a removable medium. In this case, (D2) second deduplication and (D3) writing process in FIG. 31 can be executed any time after (C) content storage process was ended, and second deduplication (second binary compare) in FIG. 31 is postponed in the (C) content storage process. Along with the embodiments described above, one of the merits of this case is that since the number of times of the access to the second chunk management table 1500 during second deduplication is reduced, the time taken for the deduplication process can be shortened.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An archive system comprising:
   a deduplication server that receives input data; and
   a library device having a plurality of removable recording mediums, wherein:
   the deduplication server includes:
   a first memory area,
   a unique data generator that generates a unique value to each of a plurality of chunks generated by dividing the received input data, and a first management unit that manages unique data corresponding to data recorded on the plurality of removable recording mediums in the library device in a form of a table, and the library device includes:

an accommodating unit that accommodates the plurality of removable recording mediums, a drive that is configured to perform at least one of recording data onto at least one of the plurality of removable recording mediums or reproduce the data recorded on the at least one of the plurality of removable recording mediums, and a carrying unit that carries the at least one of the plurality of removable recording mediums to the drive from the accommodating unit, for each chunk of the plurality of chunks, the deduplication server is configured to:

determine a match by comparing the generated unique value of the chunk to unique data corresponding to at least a portion of the data recorded on the at least one of the plurality of removable recording medium, store the chunk in a second memory area of the deduplication server if a match is determined, otherwise, the chunk is stored in the first memory area, determine a match by binary comparing the chunk stored in the second memory area with the portion of the data recorded on the at least one of the plurality of removable recording medium, and discard the chunk stored in the second memory area if a match is determined.

2. The archive system according to claim 1, wherein the deduplication server is further configured to:

write the chunk stored in the first memory area to the writing buffer area, and then write the chunk from the writing buffer to the one of the plurality of removable recording mediums inserted into the drive.

3. The archive system according to claim 1, wherein:

the archive system further comprises a second management unit that manages the unique value corresponding to each of the plurality of chunks stored in the second memory area of the deduplication server in a form of a table, and the deduplication server is further configured to:

receive new input data, and, for each of a plurality of chunks generated by dividing the received new input data:

determine a match by further comparing a generated unique value of the chunk to the unique data corresponding to the chunk stored in the second memory area of the deduplication server, and binary compare the chunk with the chunk stored in the second memory area.

4. The archive system according to claim 3, wherein the deduplication server is further configured to:

when a match is not determined by further comparing the generated unique value of the chunk to the unique data corresponding to the chunk stored in the second memory area of the deduplication server, store the chunk in the writing buffer area, and then write the chunk stored in the writing buffer area in the at least one of the plurality of removable recording mediums.

5. The archive system according to claim 3, wherein:

on a condition that any one of the plurality of chunks is used in the further comparison a predetermined number of times or more than the predetermined number of times within a predetermined period, the chunk that is used in the further comparison the predetermined number of times or more than the predetermined number of times within the predetermined period is accumulated in the second memory area of the deduplication server.

6. The archive system according to claim 1, wherein the plurality of removable recording mediums are optical disks.

7. The archive system according to claim 1, wherein the deduplication server is further configured to:

when a free space of the writing buffer area becomes not more than a predetermined amount, write the chunk stored in the writing buffer area in the at least one of the plurality of removable recording mediums.

8. The archive system according to claim 1, wherein the deduplication server is further configured to:

when a match is determined by comparing the generated unique value of the chunk to the unique data corresponding to at least a portion of the data recorded on the at least one of the plurality of removable recording medium, and the chunk is stored in the second memory area of the deduplication server, and when the at least one of the plurality of removable recording mediums on which the at least a portion of the data corresponding to the unique data is stored is inserted into the drive, or when a free space of the second memory area becomes not more than a predetermined amount, binary compare the chunk stored in the second memory area of the deduplication server and at least a portion of the data stored on the one of the plurality of removable recording mediums inserted into the drive.

9. A deduplication server that receives input data, and that can be connected to a library device having a plurality of removable recording mediums, the deduplication server comprising:

a first memory area;

a unique data generator that generates a unique value to each of a plurality of chunks generated by dividing the received input data; and a first management unit that manages unique data corresponding to data recorded on the plurality of removable recording mediums in the library device in a form of a table, wherein:

for each chunk of the plurality of chunks, the deduplication server is configured to:

determine a match by comparing the generated unique value of the chunk to unique data corresponding to at least a portion of the data recorded on the at least one of the plurality of removable recording medium, store the chunk in a second memory area of the deduplication server if a match is determined, otherwise, the chunk is stored in the first memory area, determine a match by binary comparing the chunk stored in the second memory area with the portion of the data recorded on the at least one of the plurality of removable recording medium, and discard the chunk stored in the second memory area if a match is determined.

10. The deduplication server according to claim 9, wherein the deduplication server is configured to issue an instruction such that the chunk stored in the first memory area is written to a writing buffer area and then the chunk stored in the writing buffer area is written in the one of the plurality of removable recording mediums inserted into the drive.

11. The deduplication server according to claim 9, wherein:

the deduplication server further comprises a second management unit that manages the unique value corresponding to each of the plurality of chunks stored in the second memory area of the deduplication server in a form of a table, and the deduplication server is further configured to:
when new input data is received, for each of a plurality of chunks generated by dividing the received new input data:
a match is determined by further comparing a generated unique value of the chunk to unique data corresponding to the chunk stored in the second memory area of the deduplication server, and
the chunk is binary compared with the chunk stored in the second memory area.

12. The deduplication server according to claim 11, wherein the deduplication server is further configured to:
issue an instruction such that, when a match is not determined by further comparing the generated unique value of the chunk to the unique data corresponding to chunk stored in the second memory area of the deduplication server, the chunk is stored in the writing buffer area, and then is written in the at least one of the plurality of removable recording mediums.

13. The deduplication server according to claim 11, wherein the plurality of removable recording mediums are optical disks.

14. The deduplication server according to claim 11, wherein the deduplication server is further configured to:
issue an instruction such that on a condition that any one of the plurality of chunks is used in the further comparison a predetermined number of times or more than the predetermined number of times within a predetermined period, the chunk that is used in the further comparison the predetermined number of times or more than the predetermined number of times within the predetermined period is accumulated in the second memory area of the deduplication server.

15. The deduplication server according to claim 9, wherein the deduplication server is further configured to:
issue an instruction such that, when a free space of the writing buffer area becomes not more than a predetermined amount, the chunk stored in the writing buffer area is written in the one of the plurality of removable recording mediums inserted into the drive.

16. The deduplication server according to claim 9, wherein the deduplication server is further configured to:
issue an instruction such that, when a match is determined by comparing the unique value of the chunk to the unique data corresponding to at least a portion of the data recorded on the at least one of the plurality of removable recording mediums, and the chunk is stored in the second memory area of the deduplication server, and when one of the plurality of removable recording mediums on which the at least a portion of the data corresponding to the unique data is stored is inserted into the drive, or when a free space of the second memory area becomes not more than a predetermined amount, the chunk stored in the second memory area of the deduplication server and at least a portion of the data stored on the one of the plurality of removable recording mediums inserted into the drive are binary compared.

* * * * *